(12) United States Patent
Pfeffer et al.

(10) Patent No.: US 10,389,853 B2
(45) Date of Patent: Aug. 20, 2019

(54) APPARATUS AND METHODS FOR CONTENT DISTRIBUTION TO PACKET-ENABLED DEVICES VIA A NETWORK BRIDGE

(71) Applicant: Time Warner Cable Enterprises LLC, New York, NY (US)

(72) Inventors: Howard Pfeffer, Reston, VA (US);
Noah Paci, Westminster, CO (US);
Tushar Nakhre, Herndon, VA (US);
Andrew Danforth, Chantilly, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 199 days.

(21) Appl. No.: 15/243,353

(22) Filed: Aug. 22, 2016

(65) Prior Publication Data
US 2017/0048357 A1 Feb. 16, 2017

Related U.S. Application Data

(62) Division of application No. 13/403,814, filed on Feb. 23, 2012, now Pat. No. 9,426,123.

(51) Int. Cl.
*H04L 29/06* (2006.01)
*H04N 21/61* (2011.01)
(Continued)

(52) U.S. Cl.
CPC ............ *H04L 67/42* (2013.01); *G06F 3/0482* (2013.01); *H04L 63/0236* (2013.01);
(Continued)

(58) Field of Classification Search
CPC ... H04L 67/42; H04L 63/0236; H04L 63/102; G06F 3/0482; H04N 21/6118; H04N 21/64322; H04N 21/64707
See application file for complete search history.

(56) References Cited

U.S. PATENT DOCUMENTS 6,016,316 A    1/2000 Moura et al.
6,769,127 B1 * 7/2004 Bonomi ................. H04H 60/72
                                                        725/39
(Continued)

FOREIGN PATENT DOCUMENTS

WO    WO-2010008487 A1    1/2010
WO    WO-2011035443 A1    3/2011
WO    WO-2011053858 A1    5/2011

OTHER PUBLICATIONS

Apple Inc., HTTP Live Streaming Overview, Apr. 1, 2011.
(Continued)

*Primary Examiner* — Sarah Su
(74) *Attorney, Agent, or Firm* — Gazdzinski & Associates, PC

(57) ABSTRACT

Apparatus and methods for providing content to packet-enabled devices in a content distribution network. In one embodiment, a network architecture is disclosed which enables delivery of content to IP-enabled devices such as mobile smartphones and tablet computers using a traditional high-speed data connection. This capability allows the managed network operator to provide content services to an IP-enabled device associated with a non-data subscriber. In one variant, a cable modem is provided which is limited to only retrieve content for delivery to the devices, yet which performs no other functions/services (including provision of high-speed data services). Alternatively, a "media server" modem is utilized to enable delivery of content from the managed network to a client or user device which is also able to obtain high-speed data service from a non-managed or third party managed network via a third-party access point. Security and authentication mechanisms for the transmitted content are also disclosed.

20 Claims, 12 Drawing Sheets

(51) Int. Cl.
*H04N 21/643* (2011.01)
*H04N 21/647* (2011.01)
*G06F 3/0482* (2013.01)

(52) U.S. Cl.
CPC ....... *H04L 63/102* (2013.01); *H04N 21/6118* (2013.01); *H04N 21/64322* (2013.01); *H04N 21/64707* (2013.01)

(56) References Cited

U.S. PATENT DOCUMENTS

| | | |
|---|---|---|
| 6,917,614 B1 | 7/2005 | Laubach et al. |
| 6,917,641 B2 | 7/2005 | Kotzin et al. |
| 7,174,126 B2 | 2/2007 | McElhatten et al. |
| 7,457,520 B2 | 11/2008 | Rossetti et al. |
| 7,592,912 B2 | 9/2009 | Hasek et al. |
| 7,602,820 B2 | 10/2009 | Helms et al. |
| 7,763,360 B2 | 7/2010 | Paul et al. |
| 7,954,131 B2 | 5/2011 | Cholas et al. |
| 8,024,762 B2 | 9/2011 | Britt |
| 8,073,460 B1 | 12/2011 | Scofield et al. |
| 8,078,696 B2 | 12/2011 | Lajoie et al. |
| 8,090,014 B2 | 1/2012 | Cheung et al. |
| 8,090,104 B2 | 1/2012 | Wajs et al. |
| 8,095,610 B2 | 1/2012 | Gould et al. |
| 8,099,757 B2 | 1/2012 | Riedl et al. |
| 8,151,294 B2 | 4/2012 | Carlucci et al. |
| 8,181,209 B2 | 5/2012 | Hasek et al. |
| 8,214,256 B2 | 7/2012 | Riedl et al. |
| 8,280,982 B2 | 10/2012 | La et al. |
| 8,341,242 B2 | 12/2012 | Dillon et al. |
| 8,396,055 B2 | 3/2013 | Patel et al. |
| 8,472,371 B1 | 6/2013 | Bari et al. |
| 8,516,529 B2 | 8/2013 | Lajoie et al. |
| 8,561,116 B2 | 10/2013 | Hasek |
| 8,782,194 B2* | 7/2014 | Eyal .................. G06F 17/30038 709/223 |
| 8,838,149 B2 | 9/2014 | Hasek |
| 9,021,566 B1 | 4/2015 | Panayotopoulos et al. |
| 2003/0056217 A1 | 3/2003 | Brooks |
| 2003/0086422 A1 | 5/2003 | Klinker et al. |
| 2003/0123465 A1 | 7/2003 | Donahue |
| 2004/0083177 A1 | 4/2004 | Chen et al. |
| 2005/0002638 A1 | 1/2005 | Putterman et al. |
| 2005/0028208 A1 | 2/2005 | Ellis et al. |
| 2005/0034171 A1 | 2/2005 | Benya |
| 2006/0059532 A1 | 3/2006 | Dugan et al. |
| 2006/0128397 A1 | 6/2006 | Choti et al. |
| 2006/0139379 A1 | 6/2006 | Toma et al. |
| 2006/0165082 A1 | 7/2006 | Pfeffer et al. |
| 2007/0014293 A1 | 1/2007 | Filsfils et al. |
| 2007/0022459 A1 | 1/2007 | Gaebel et al. |
| 2007/0033531 A1 | 2/2007 | Marsh |
| 2007/0094691 A1 | 4/2007 | Gazdzinski |
| 2007/0136777 A1 | 6/2007 | Hasek et al. |
| 2007/0157228 A1 | 7/2007 | Bayer et al. |
| 2007/0199019 A1* | 8/2007 | Angiolillo .......... H04N 7/17318 725/39 |
| 2007/0204308 A1 | 8/2007 | Nicholas et al. |
| 2007/0217436 A1 | 9/2007 | Markley et al. |
| 2007/0276925 A1 | 11/2007 | La et al. |
| 2008/0027801 A1 | 1/2008 | Walter et al. |
| 2008/0066095 A1 | 3/2008 | Reinoso |
| 2008/0092058 A1 | 4/2008 | Afergan et al. |
| 2008/0109853 A1 | 5/2008 | Einarsson et al. |
| 2008/0168487 A1 | 7/2008 | Chow et al. |
| 2008/0184344 A1 | 7/2008 | Hernacki et al. |
| 2008/0189617 A1* | 8/2008 | Covell ................ G06F 17/3089 715/738 |
| 2008/0200154 A1 | 8/2008 | Maharajh et al. |
| 2008/0201736 A1 | 8/2008 | Gordon et al. |
| 2008/0215755 A1 | 9/2008 | Farber et al. |
| 2008/0235746 A1 | 9/2008 | Peters et al. |
| 2008/0256615 A1 | 10/2008 | Schlacht et al. |
| 2009/0006211 A1 | 1/2009 | Perry et al. |
| 2009/0064218 A1* | 3/2009 | Yamagishi ....... H04N 21/41407 725/25 |
| 2009/0076898 A1 | 3/2009 | Wang et al. |
| 2009/0077583 A1 | 3/2009 | Sugiyama et al. |
| 2009/0083279 A1 | 3/2009 | Hasek |
| 2009/0094347 A1 | 4/2009 | Ting et al. |
| 2009/0119703 A1 | 5/2009 | Piepenbrink et al. |
| 2009/0132347 A1 | 5/2009 | Anderson et al. |
| 2009/0187939 A1 | 7/2009 | Lajoie |
| 2009/0210899 A1 | 8/2009 | Lawrence-Apfelbaum et al. |
| 2009/0228941 A1 | 9/2009 | Russell et al. |
| 2009/0248794 A1 | 10/2009 | Helms et al. |
| 2009/0327057 A1 | 12/2009 | Redlich |
| 2009/0328109 A1* | 12/2009 | Pavlovskaia ....... H04N 7/17318 725/70 |
| 2010/0027787 A1 | 2/2010 | Benkert et al. |
| 2010/0036720 A1 | 2/2010 | Jain et al. |
| 2010/0046927 A1* | 2/2010 | Manthoulis ........ H04N 21/2181 386/241 |
| 2010/0082635 A1* | 4/2010 | Elsner ................ H04N 7/17318 707/741 |
| 2010/0115540 A1 | 5/2010 | Fan et al. |
| 2010/0121936 A1 | 5/2010 | Liu et al. |
| 2010/0131973 A1 | 5/2010 | Dillon et al. |
| 2010/0132003 A1 | 5/2010 | Bennett et al. |
| 2010/0146541 A1 | 6/2010 | Velazquez |
| 2010/0162367 A1 | 6/2010 | Lajoie et al. |
| 2010/0169503 A1 | 7/2010 | Kollmansberger et al. |
| 2010/0186029 A1 | 7/2010 | Kim et al. |
| 2010/0251304 A1 | 9/2010 | Donoghue et al. |
| 2010/0262461 A1 | 10/2010 | Bohannon |
| 2010/0262999 A1 | 10/2010 | Curran |
| 2010/0313225 A1 | 12/2010 | Cholas et al. |
| 2010/0333137 A1 | 12/2010 | Hamano et al. |
| 2011/0015989 A1 | 1/2011 | Tidwell et al. |
| 2011/0016479 A1 | 1/2011 | Tidwell et al. |
| 2011/0055866 A1 | 3/2011 | Piepenbrink et al. |
| 2011/0058675 A1 | 3/2011 | Brueck et al. |
| 2011/0083069 A1 | 4/2011 | Paul et al. |
| 2011/0083144 A1 | 4/2011 | Bocharov et al. |
| 2011/0093900 A1 | 4/2011 | Patel et al. |
| 2011/0103374 A1 | 5/2011 | Lajoie et al. |
| 2011/0107364 A1 | 5/2011 | Lajoie et al. |
| 2011/0107379 A1 | 5/2011 | Lajoie et al. |
| 2011/0138064 A1 | 6/2011 | Rieger et al. |
| 2011/0154383 A1 | 6/2011 | Hao et al. |
| 2011/0154409 A1* | 6/2011 | Rhee .................. H04L 29/08 725/62 |
| 2011/0223944 A1 | 9/2011 | Gosselin |
| 2011/0231660 A1 | 9/2011 | Kanungo |
| 2011/0246616 A1 | 10/2011 | Ronca et al. |
| 2011/0258049 A1 | 10/2011 | Ramer et al. |
| 2011/0264530 A1 | 10/2011 | Santangelo et al. |
| 2011/0265116 A1 | 10/2011 | Stern et al. |
| 2011/0302624 A1 | 12/2011 | Chen et al. |
| 2012/0008786 A1 | 1/2012 | Cronk et al. |
| 2012/0011567 A1* | 1/2012 | Cronk .................. H04L 63/102 726/4 |
| 2012/0072526 A1 | 3/2012 | Kling et al. |
| 2012/0076015 A1 | 3/2012 | Pfeffer |
| 2012/0079523 A1 | 3/2012 | Trimper et al. |
| 2012/0089699 A1 | 4/2012 | Cholas |
| 2012/0096106 A1 | 4/2012 | Blumofe et al. |
| 2012/0124612 A1 | 5/2012 | Adimatyam et al. |
| 2012/0137332 A1 | 5/2012 | Kumar |
| 2012/0144195 A1 | 6/2012 | Nair et al. |
| 2012/0151077 A1 | 6/2012 | Finster |
| 2012/0167132 A1 | 6/2012 | Mathews et al. |
| 2012/0170544 A1 | 7/2012 | Cheng et al. |
| 2012/0170741 A1 | 7/2012 | Chen et al. |
| 2012/0173746 A1 | 7/2012 | Salinger et al. |
| 2012/0185693 A1 | 7/2012 | Chen et al. |
| 2012/0197980 A1* | 8/2012 | Terleski .................. G06Q 50/01 709/203 |
| 2012/0246462 A1 | 9/2012 | Moroney et al. |
| 2012/0278833 A1 | 11/2012 | Tam et al. |
| 2012/0284804 A1 | 11/2012 | Lindquist et al. |
| 2012/0308071 A1 | 12/2012 | Ramsdell et al. |
| 2012/0324552 A1 | 12/2012 | Padala et al. |

(56) References Cited

U.S. PATENT DOCUMENTS

| | | |
|---|---|---|
| 2013/0024901 A1* | 1/2013 | Sharif-Ahmadi ............................ G06F 17/30017 725/114 |
| 2013/0031578 A1 | 1/2013 | Zhu et al. |
| 2013/0046849 A1 | 2/2013 | Wolf et al. |
| 2013/0132986 A1 | 5/2013 | Mack et al. |
| 2013/0133010 A1 | 5/2013 | Chen |
| 2013/0166906 A1 | 6/2013 | Swaminathan et al. |
| 2013/0174271 A1 | 7/2013 | Handal et al. |
| 2013/0179588 A1 | 7/2013 | McCarthy et al. |
| 2013/0198770 A1* | 8/2013 | Xiong .................. H04N 21/654 725/25 |
| 2013/0219178 A1 | 8/2013 | Xiques et al. |
| 2013/0227283 A1 | 8/2013 | Williamson et al. |
| 2013/0227284 A1 | 8/2013 | Pfeffer et al. |
| 2014/0012843 A1 | 1/2014 | Soon-Shiong |
| 2014/0230003 A1 | 8/2014 | Ma et al. |
| 2014/0245341 A1 | 8/2014 | Mack et al. |
| 2014/0259182 A1 | 9/2014 | Mershon |
| 2015/0109122 A1 | 4/2015 | Stern et al. |
| 2015/0163540 A1 | 6/2015 | Masterson |
| 2015/0215424 A1* | 7/2015 | Chun ...................... H04L 67/32 709/217 |
| 2016/0241617 A1 | 8/2016 | Jelley et al. |
| 2017/0048357 A1* | 2/2017 | Pfeffer ................ H04L 63/0236 |

OTHER PUBLICATIONS

Extended European Search Report for Application No. EP13155950, dated Jun. 14, 2013, 6 pages.

OpenCable Specifications, Alternate Content, Real-Time Event Signaling and Management API, OC-SP-ESAM-API-I01-120910 (2012).

SCTE American National Standard ANSI/SCTE 118-2 2007.

SCTE American National Standard ANSI/SCTE 130-1 2008.

SCTE, American National Standard, ANSI/SCTE 35 2012.

Zarnbelli, The Apparatus and Methods of HS Smooth Streaming Technical Overview, Mar. 2009.

* cited by examiner

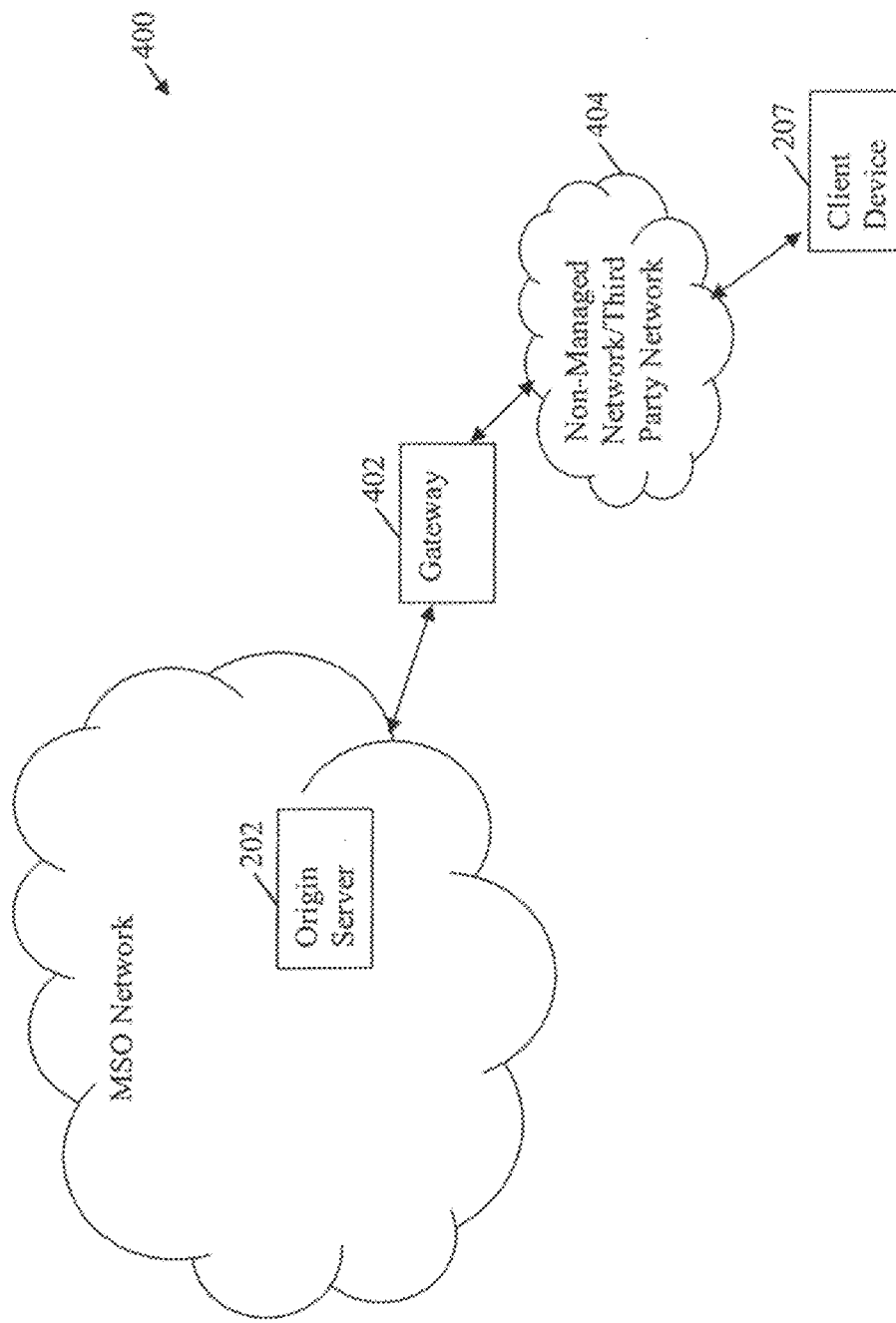

APPARATUS AND METHODS FOR CONTENT DISTRIBUTION TO PACKET-ENABLED DEVICES VIA A NETWORK BRIDGE

PRIORITY AND RELATED APPLICATIONS

This application is a divisional of and claims priority to co-owned and co-pending U.S. patent application Ser. No. 13/403,814 of the same title filed Feb. 23, 2012, and issuing as U.S. Pat. No. 9,426,123 on Aug. 23, 2016, which is incorporated herein by reference in its entirety. In addition, this application is related to co-owned U.S. patent application Ser. No. 13/403,802 filed on Feb. 23, 2012 and entitled "APPARATUS AND METHODS FOR PROVIDING CONTENT TO AN IP-ENABLED DEVICE IN A CONTENT DISTRIBUTION NETWORK", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data and content distribution and delivery. In one exemplary aspect, the invention relates to the delivery of content to an IP-enabled device via a content distribution network.

2. Description of Related Technology

Content distribution networks (such as e.g., Cable Television (CATV), satellite, or hybrid fiber/copper (HFCu) systems) provide content from various content sources at a network headend to a plurality of subscriber devices. In a typical "managed" network, a network operator (e.g., multiple systems operator or MSO) provides access to content via the network. Generally, the MSO provides audio/video content to subscribers via the network headend.

Recent advances in digital information processing and technology have made a whole range of services and functions available for delivery to consumers at various types of devices for very reasonable prices or subscription fees. These services and functions include delivery of digital content or programming (movies, etc.), digital video-on-demand (VOD) services, personal video recorder (PVR) and networked PVR (nPVR) services, Internet Protocol television (IPTV), digital media playback and recording, as well high speed Internet access (including so-called "Internet TV", where television programming is delivered over the Internet) and IP-based telephony (e.g., VoIP). Other services available to network users include without limitation access to, and recording of, digital music (e.g., MP3 files), and submission of "organic" media (e.g., home-grown YouTube™ videos, etc.).

Currently, many of these services are provided to users via a wide variety of different equipment environments and delivery paradigms including, inter alia, cable or satellite modems or QAMs, HFCu (i.e., Hybrid Fiber-copper distribution via indigenous POST/PSTN and/or coaxial wiring in a premises), optical fiber such as FTTC, FTTH, etc., Wi-Fi™ hubs, Ethernet hubs, gateways, switches, and routers, and to a plurality of user equipment types (e.g., set-top boxes, personal (desktop) computers, laptop computers, other mini-computers such as so-called "netbooks" and mini-notebook computers, and/or other devices). Recent advances in consumer electronics have also led to the widespread introduction of a variety of portable media devices (PMDs) such as, inter alia, portable digital music devices such as the well known Apple iPodM, and other so-called "MP3 players", cellular telephones/smartphones, handheld computers, tablets such as the Kindle™ and Nook™ and iPad™; and personal digital assistants (PDA), which allow users to store and playback audio and video files.

Although a myriad of services, equipment, data formats and providers are available, current systems offer no suitable mechanism for efficiently providing content to IP-enabled devices via a managed network without utilizing a traditional IP content delivery system (i.e., a high speed data connection, such as a cable modem termination system or CMTS). As noted previously, network operators may be capable of providing audio/video data over their own managed IP content delivery networks; however, such mechanisms are only accessible to subscribers of the network via a high-speed data connection. For example, "basic cable" CATV subscribers (which often form the backbone of revenue streams for a managed network operator), do not under existing technology have access to MSO-provided content via an IP-enabled device such as a PC, smartphone, or tablet computer.

Hence, methods and apparatus are needed which enable flexible delivery of content to IP-enabled devices without the use of a high-speed data connection; i.e., via another distribution platform (such as for example a traditional CATV or other distribution network). Ideally, the methods and apparatus would be able to allow the network operator to provide audio/video content services to an IP-enabled device associated with a non-data subscriber of the operator's network though the use of a cable modem or other network bridge. For example, an MSO would be able to make content delivery services available to a subscriber's tablet computer (e.g., iPad) when the owner thereof does not subscribe to the MSO's high-speed data network or services, and instead only subscribes to the MSO's video services via a network bridge. Such methods and apparatus would advantageously enable a user to receive content on IP-enabled devices, which are generally more mobile than non-IP devices, thereby enhancing the user experience by no longer anchoring the user to a fixed location.

The foregoing delivery of content may ideally utilize a modem to provide the content to the user devices which is limited to only retrieving content for delivery to the IP-enabled devices, and cannot access high-speed data services or other prohibited functions/services. In addition, the modem may be configured to filter or block traffic to or from an unauthorized entity. Ideal solutions may further enable the MSO network user/subscriber to no longer be limited to utilizing access points which are serviced by an MSO managed network and may include a premises modem which is able to register as a client of a third-party provided access point; however, is able to receive requested content from the distribution network for delivery to the client devices.

Furthermore, the ideal solution would take advantage of extant network structure and function to the maximum extent practicable in order to minimize MSO investment/latency in providing such services.

SUMMARY OF THE INVENTION

The present invention provides, inter alia, apparatus and methods for packet (e.g., IP) content distribution to packet-enabled devices.

In a first aspect of the invention, an apparatus for receiving content from a managed network, and providing the content to at least one client device is disclosed. In one embodiment, the client device is an Internet protocol (IP)-enabled client device, and the apparatus includes a network interface, a client interface, a storage device having at least one computer program stored thereon, and a processor in communication with the network and client interfaces and the storage device.

In one variant, the processor is configured to run the at least one computer program thereon, the at least one computer program configured to, when executed: receive a request for content via the client interface, provide at least one address within the managed network for the request, and transmit the request to the at least one address via the network interface and a high-speed data channel of the managed network.

In another variant, the provision of the at least one address is performed so that only the content can be retrieved via the high-speed data channel, and no high-speed data services can be provided via the high-speed data channel.

In a second aspect of the invention, a method for providing content to an Internet protocol (IP)-enabled consumer device is disclosed. In one embodiment, the method includes receiving at a first apparatus a request to access content from the IP-enabled consumer device, providing the request and a plurality of information necessary to verify permission of the consumer device to access the content to at least one network entity, the at least one entity verifying the permission of the consumer device, and upon verification of the permission of the consumer device, receiving data relating to the content, the data enabling the consumer device to obtain at least portions of the content for delivery. In one variant, the delivery includes providing the content to the consumer device via the first apparatus over a repurposed high-speed data channel.

In a third aspect of the invention, an apparatus for providing packetized content provided from a content distribution network to at least one Internet protocol (IP)-enabled client device is disclosed. In one embodiment, the apparatus includes a first interface for communication with the content distribution network, a second interface for communication with a third party access point, the access point configured to provide data from a third party network at least to the IP-enabled client device, and a processor in communication with the first and second interfaces and configured to run at least one computer program thereon.

In one variant, the at least one computer program comprises a plurality of commands which, when executed on the processor, cause the apparatus to: receive via the second interface a request issued from the client device for delivery of packetized content from the content distribution network, cause routing of the request via the first interface to an entity of the content distribution network for servicing the request, receive the requested content from the content distribution network, and cause forwarding the received content to the IP-enabled client device for rendering.

In a fourth aspect of the invention, a client apparatus for receiving content from a managed network is disclosed. In one embodiment, the client apparatus includes a communications interface, a display device, and a processor in communication with the display device and the communications interface. In one variant, the processor is configured to run at least one computer application thereon, the at least one computer application configured to, when executed display a listing of a plurality of content elements available for download from the network on the display device, receive a selection of at least one of the content elements from a user, issue a request to an entity for the at least one selected content element via the communications interface, receive a plurality of segments from the entity via the interface, receive a playlist from the entity via the interface, and use the playlist to utilize the segments to render the at least one content element on the display device.

In a fifth aspect of the invention, method of providing packetized media over a managed network is disclosed. In one embodiment. The network has at least a first channel configured for delivery of media content, and a second channel configured for delivery of high-speed data service, and the method includes enabling a user to receive only the media content otherwise available on the first channel as packetized media via the second channel.

In a sixth aspect of the invention, a method of providing packetized media over a managed network having a first channel configured for delivery of media content, and a second channel configured for delivery of high-speed data service is disclosed. In one embodiment, the method includes enabling a user to receive the media content via the first channel, or as packetized content via the second channel, and restricting a user from receiving any of the high speed data service via the second channel.

In a seventh aspect of the invention, a method of providing Internet Protocol (IP) content delivery services to mobile device users via a managed content distribution network having both a first media delivery channel and a second high speed data channel is disclosed. In one embodiment, the method includes associating a mobile device with an apparatus capable of accessing the second channel, issuing a request to receive IP content from the mobile device to the network via the apparatus, receiving the requested content at the mobile device from the network via the apparatus and the second channel, and rendering the content on the mobile device.

In one variant, the apparatus restricts the mobile device from otherwise receiving any high speed data services via the apparatus and the second channel.

In an eighth aspect of the invention, a managed network architecture is disclosed. In one embodiment, the managed network architecture enables delivery of packetized (e.g., IP) content to user devices without use of high-speed data service infrastructure.

In a ninth aspect of the invention, a method of doing business is disclosed. In one embodiment, the method includes providing a separate service class (e.g., mobile IP data) for network users/subscribers that is decoupled from high-speed data service provided by the same network; i.e., IP delivery without the need for high-speed data service.

In a tenth aspect of the invention, a computer readable medium is disclosed. In one embodiment, the computer readable medium comprises a plurality of instructions which are configured to, when executed enable delivery of Internet Protocol (IP) content delivery services to mobile device users via a managed content distribution network having both a first media delivery channel and a second high speed data channel.

In a further aspect of the disclosure, a method for receiving content from a managed network is disclosed. In one embodiment, the method includes: (i) displaying a listing of a plurality of content elements available for access from the network on a display device; (ii) receiving a selection of at least one of the content elements from a user; (iii) issuing a request to an entity for the at least one selected content element via a communications interface; (iv) receiving packetized content from the entity via at least one channel configured for delivery of high-speed data services; and (v) using the packetized content to render the at least one content element on the display device.

In a further aspect of the disclosure, a non-transitory computer-readable apparatus is disclosed. In one embodiment, the non-transitory computer-readable apparatus includes media configured to store a computer program thereon. In one variant, the computer program includes a plurality of instructions which are configured to, when executed by a processing apparatus: (i) display a listing of a plurality of content elements available for access from a managed network on a display device; (ii) receive a selection of at least one of the content elements from a user; (iii) issue a request to an entity for the at least one selected content element; (iv) receive a plurality of segments from the entity via an Internet-Protocol (IP) multicast carrying at least one channel configured for delivery of high-speed data services; (v) receive a playlist from the entity via the IP multicast; and (vi) use the playlist to utilize the segments to render the at least one content element on the display device.

These and other aspects of the invention shall become apparent when considered in light of the disclosure provided herein.

BRIEF DESCRIPTION OF THE DRAWINGS

FIG. 4 is a functional block diagram illustrating yet another exemplary embodiment of a content distribution network architecture for providing content to an IP-enabled device according to the present invention.

FIG. 6 is logical flow diagram illustrating one embodiment of a methods for providing content to an IP-enabled device via a content distribution network (and third-party access point) according to the architecture of FIGS. 3-3a.

Figure 1:
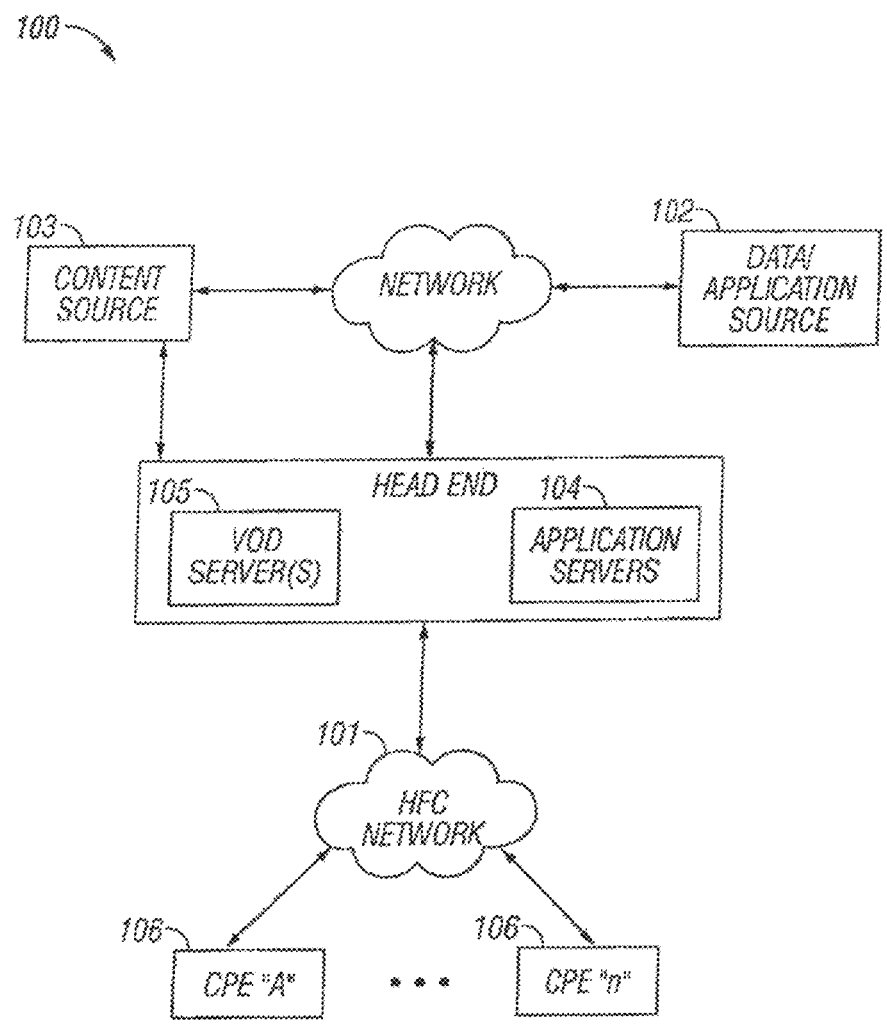
FIG. 1 is a functional block diagram illustrating an exemplary HFC cable network configuration useful with the present invention.

All Figures © Copyright 2011 Time Warner Cable, Inc. All rights reserved.

DETAILED DESCRIPTION OF THE INVENTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (RealVideo, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "consumer premises equipment (CPE)" and "host device" refer without limitation to any type of electronic equipment located within a consumer's or user's premises and connected to a network. The term "host device" includes terminal devices that have access to digital television content via a satellite, cable, or terrestrial network. The host device functionality may be integrated into a digital television (DTV) set. The term "consumer premises equipment" (CPE) includes such electronic equipment such as set-top boxes, televisions, Digital Video Recorders (DVR), gateway storage devices (Furnace), and ITV Personal Computers.

As used herein, the term "DOCSIS" refers to any of the existing or planned variants of the Data Over Cable Services Interface Specification, including for example DOCSIS versions 1.0, 1.1, 2.0 and 3.0.

As used herein, the term "gateway" includes, without limitation, devices configured to interface with a network, and pass signals to or exchange signals with, another device in communication therewith. Various exemplary gateways are described in, inter alia, co-owned U.S. patent application Ser. No. 11/818,236 filed on Jun. 13, 2007 entitled "PREMISES GATEWAY APPARATUS AND METHODS FOR USE IN A CONTENT-BASED NETWORK", which issued as U.S. Pat. No. 7,954,131 on May 31, 2011, U.S. patent application Ser. No. 12/582,619 filed on Oct. 20, 2009 and entitled "GATEWAY APPARATUS AND METHODS FOR DIGITAL CONTENT DELIVERY IN A NETWORK", which issued as U.S. Pat. No. 9,027,062 on May 5, 2015, and U.S. patent application Ser. No. 12/480,597 filed on Jun. 8, 2009, entitled "MEDIA BRIDGE APPARATUS AND METHODS", and issued as U.S. Pat. No. 9,602,864 on Mar. 21, 2017, each of the foregoing being incorporated herein by reference in its entirety.

As used herein, the term "headend" refers generally to a networked system controlled by an operator (e.g., an MSO or multiple systems operator) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer without limitation to a cable, fiber to the home (FTTH), fiber to the curb (FTTC), satellite, Hybrid Fiber Copper (HFCu), or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, HFCu networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15, cellular (e.g., 3G LTE/LTE-A/TD-LTE, GSM, etc.) or IrDA families.

As used herein, the term "node" refers to any functional entity associated with a network, such as for example an OLT or ONU, whether physically discrete or distributed across multiple locations.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer system or network.

As used herein, the term "service", "content", "program" and "stream" are sometimes used synonymously to refer to a sequence of packetized data that is provided in what a subscriber may perceive as a service. A "service" (or "content", or "stream") in the former, specialized sense may correspond to different types of services in the latter, non-technical sense. For example, a "service" in the specialized sense may correspond to, among others, video broadcast, audio-only broadcast, pay-per-view, or video-on-demand. The perceivable content provided on such a "service" may be live, pre-recorded, delimited in time, undelimited in time, or of other descriptions. In some cases, a "service" in the specialized sense may correspond to what a subscriber would perceive as a "channel" in traditional broadcast television.

As used herein, the term "service group" refers without limitation to either a group of service users (e.g. subscribers), or the resources shared by them in the form of for example entire cable RF signal, only the RF channels used to receive the service or otherwise treated as a single logical unit by the network for resource assignment.

As used herein, the term "Wi-Fi" refers to, without limitation, any of the variants of IEEE-Std. 802.11 or related standards including 802.11a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present invention discloses methods and apparatus for providing content to a plurality of IP-enabled devices serviced by a content distribution network. In one exemplary embodiment, a network architecture is disclosed which enables delivery of content to such IP-enabled devices without the use of a high-speed data service; i.e., via another distribution platform (such as for example a traditional CATV or other managed distribution network in-band QAMs). This capability allows the managed network operator to provide audio/video content services to an IP-enabled device (e.g., mobile wireless content rendering device such as a smartphone or tablet computer) associated with a non-data subscriber of the operator's network. For example, an MSO is, utilizing the exemplary apparatus and methods described herein, able to make content delivery services available to a subscriber's tablet computer (e.g., iPad) when the owner thereof does not subscribe to the MSO's high-speed data network or services, and instead only subscribes to the MSO's video services. This approach advantageously enables a user to receive content on IP-enabled devices, which are generally more mobile than non-IP devices, thereby enhancing the user experience by allowing the user to received the content at various locations (as well as that specified in the subscription agreement; e.g., at the subscriber's premises). It also provides the basis for alternate business models for the network operator; i.e., since provision of IP-based content is no longer tied to high-speed data services, a larger customer base can be reached, and with greater flexibility and available options/combinations and locations.

In the exemplary implementation, extant network structure and function (e.g., DOCSIS or in-band QAMs of an HFC network) are utilized to the maximum extent in order to minimize MSO investment in providing such services, thereby also enhancing rapid incorporation of the technology and provision of services to the users/subscribers.

In one embodiment, a modem (e.g., DOCSIS-enabled cable modem) is utilized to provide content to the IP-enabled client or user devices associated with a content distribution network. The modem is configured so as to only point to a root server (or other designated servers) in the content distribution network. The modem is therefore limited to only retrieving content for delivery to the IP-enabled devices, and cannot access high-speed data services or other prohibited functions/services. In addition, the modem may be configured to filter or block traffic to or from an unauthorized entity, so as to further tailor the functionality of the modem to a desired service or set of services. Such tailoring may be useful for, inter alia, ensuring that copyright restrictions or royalty arrangements are not subrogated through delivery of the same content over multiple modalities.

In another embodiment, the client device receives Internet data from a non-managed or third-party network via a third-party provided access point. In order to receive content from the managed network (MSO network), a premises modem that acts effectively as a media server is provided. The premises modem is associated with and communicates with the MSO network. The premises modem (media server) registers as a client of the third-party provided access point; however, is identified by the content distribution (MSO) network and therefore able to receive requested content from the distribution network for delivery to the client devices. This approach advantageously offers a user of the client device a more seamless user experience when utilizing both the third-party network and the MSO network for services.

In yet another embodiment, the MSO network user/subscriber is not limited to utilizing access points which are serviced by an MSO managed network. Rather, the transcoded/transrated and segmented content and playlist are delivered to the IP-enabled device over a non-managed network or third party network such as the Internet. A network gateway is utilized to interface the non-managed network to the managed network (e.g., CATV network). Various mechanisms for ensuring the security of content transmitted utilizing the methods and apparatus of the present invention are also disclosed. Such mechanisms include, e.g., authenticating the user as a subscriber to the MSO (such as by login/password combinations), determining whether the subscriber's service/subscription level permits viewing of the requested content (and optionally one or more use restrictions), and/or determining whether the requesting device is within a home network or other premises serviced by the MSO (such as by verifying the IP or MAC address of the entity used to access the MSO network).

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber/coax (HFC) cable system architecture having an multiple systems operator (MSO), digital networking capability, IP delivery capability, and plurality of client devices/CPE, the general principles and advantages of the invention may be extended to other types of networks and architectures, whether broadband, narrowband, wired or wireless, or otherwise, the following therefore being merely exemplary in nature. For example, the invention may be practiced over a fiber-to-the-home (FTTH) or fiber-to-the-curb (FTTC) system, HFCu networks, or over satellite or millimeter wave-based networks.

It will also be appreciated that while described generally in the context of a consumer (i.e., residential) end user domain, the present invention may be readily adapted to other types of environments (e.g., commercial/enterprise, government/military, etc.) as well. Myriad other applications are possible.

It is further noted that while exemplary embodiments are described primarily in the context of a hybrid fiber/conductor (e.g., cable) system with legacy 6 MHz RF channels, the present invention is applicable to literally any network topology or paradigm, and any frequency/bandwidth. Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband systems.

Other features and advantages of the present invention will immediately be recognized by persons of ordinary skill in the art with reference to the attached drawings and detailed description of exemplary embodiments as given below.

Network—

FIG. 1 illustrates a typical content distribution network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1*a* (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104 or other network component.

Figure 1A:
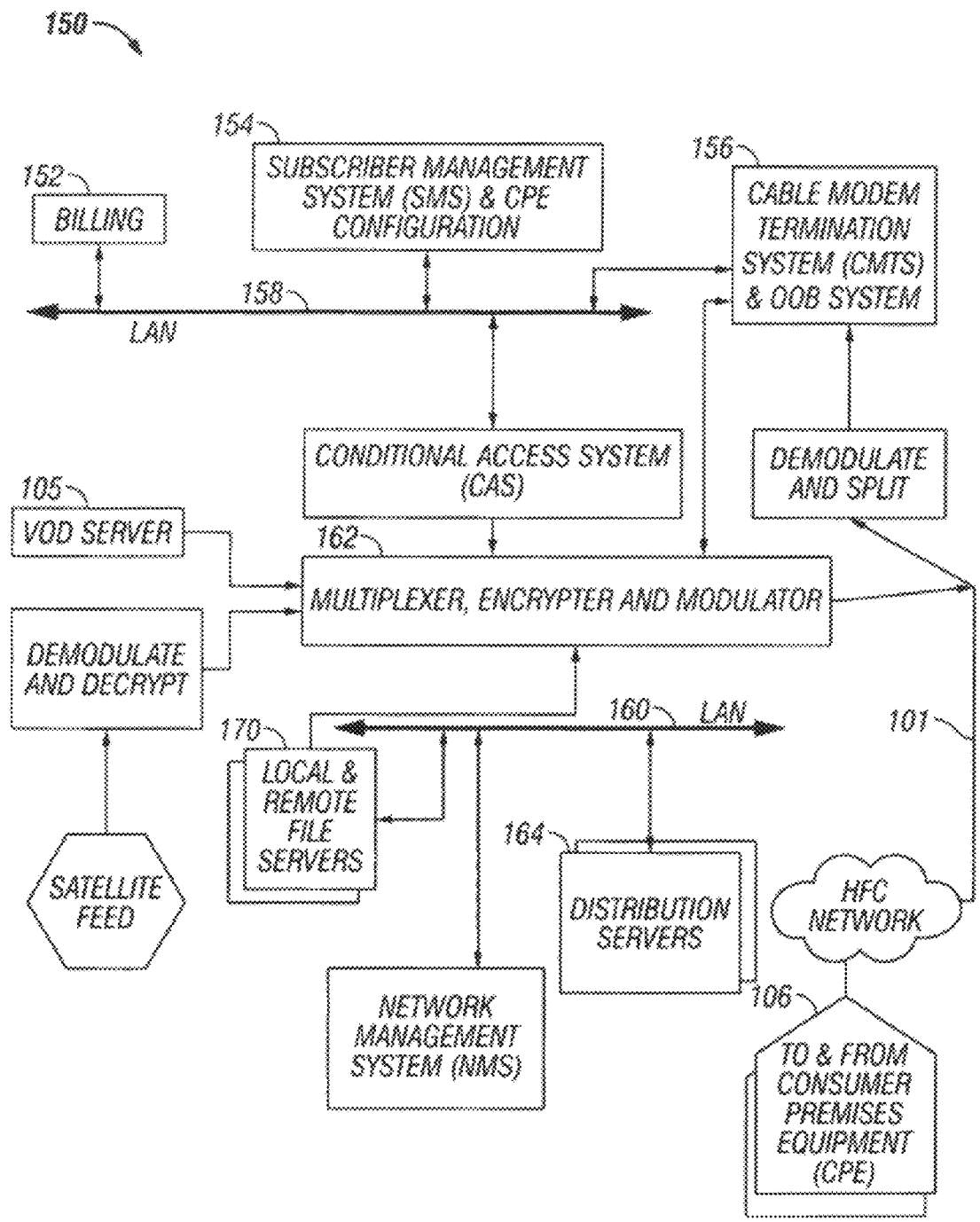
FIG. 1a is a functional block diagram illustrating one exemplary HFC cable network headend configuration useful with the present invention.

Referring now to FIG. 1*a*, one exemplary embodiment of a headend architecture useful with the present invention is described. As shown in FIG. 1*a*, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements (e.g., ring, star, etc.) may be used consistent with the invention. It will also be appreciated that the headend configuration depicted in FIG. 1*a* is high-level, conceptual architecture, and that each MSO may have multiple headends deployed using custom architectures, which may or may not be heterogeneous in layout, design, and/or functionality.

Figure 1B:
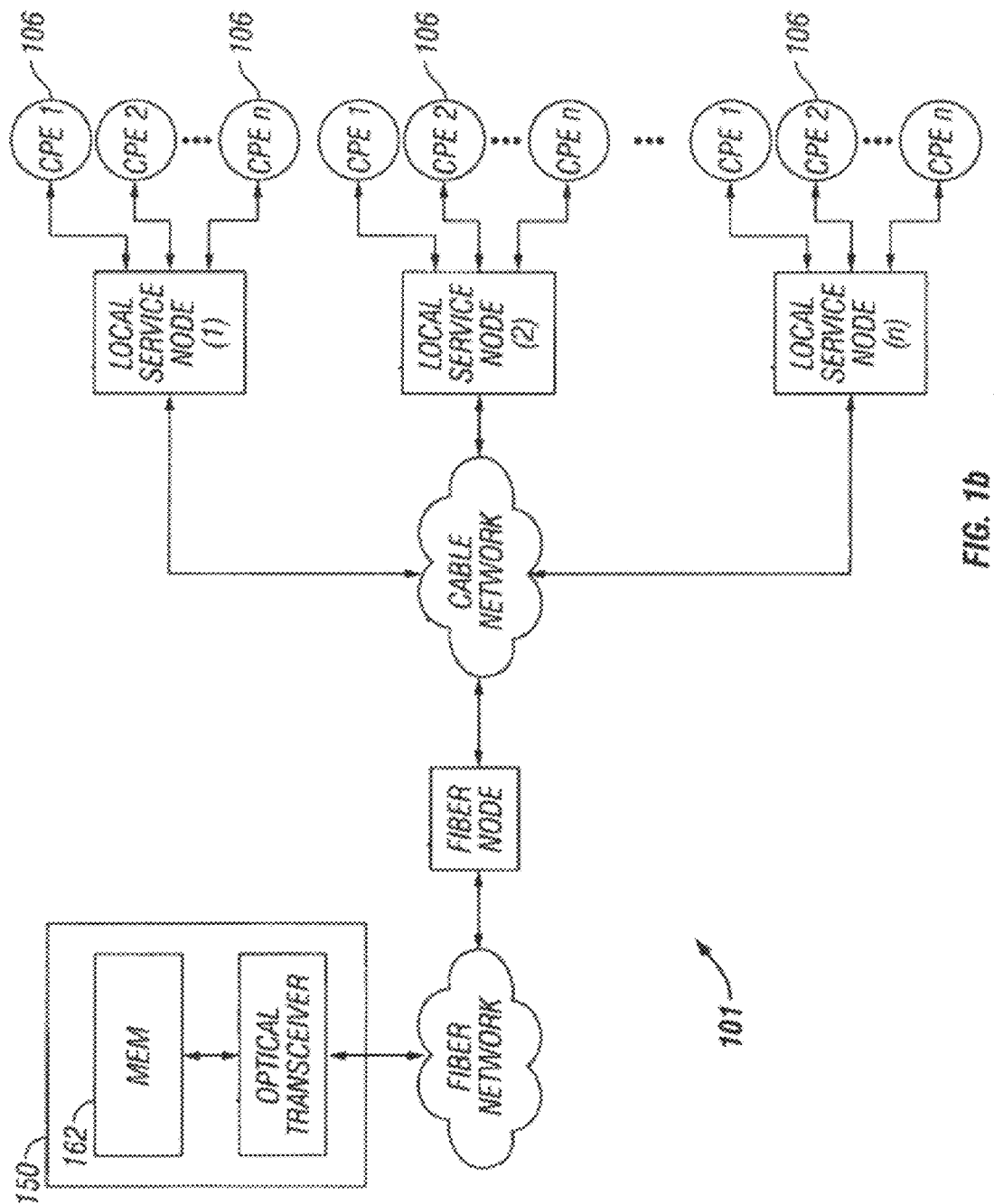
FIG. 1b is a functional block diagram illustrating one exemplary local service node configuration useful with the present invention.

The exemplary architecture 150 of FIG. 1*a* further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1*b*) via a variety of interposed network components.

Figure 1C:
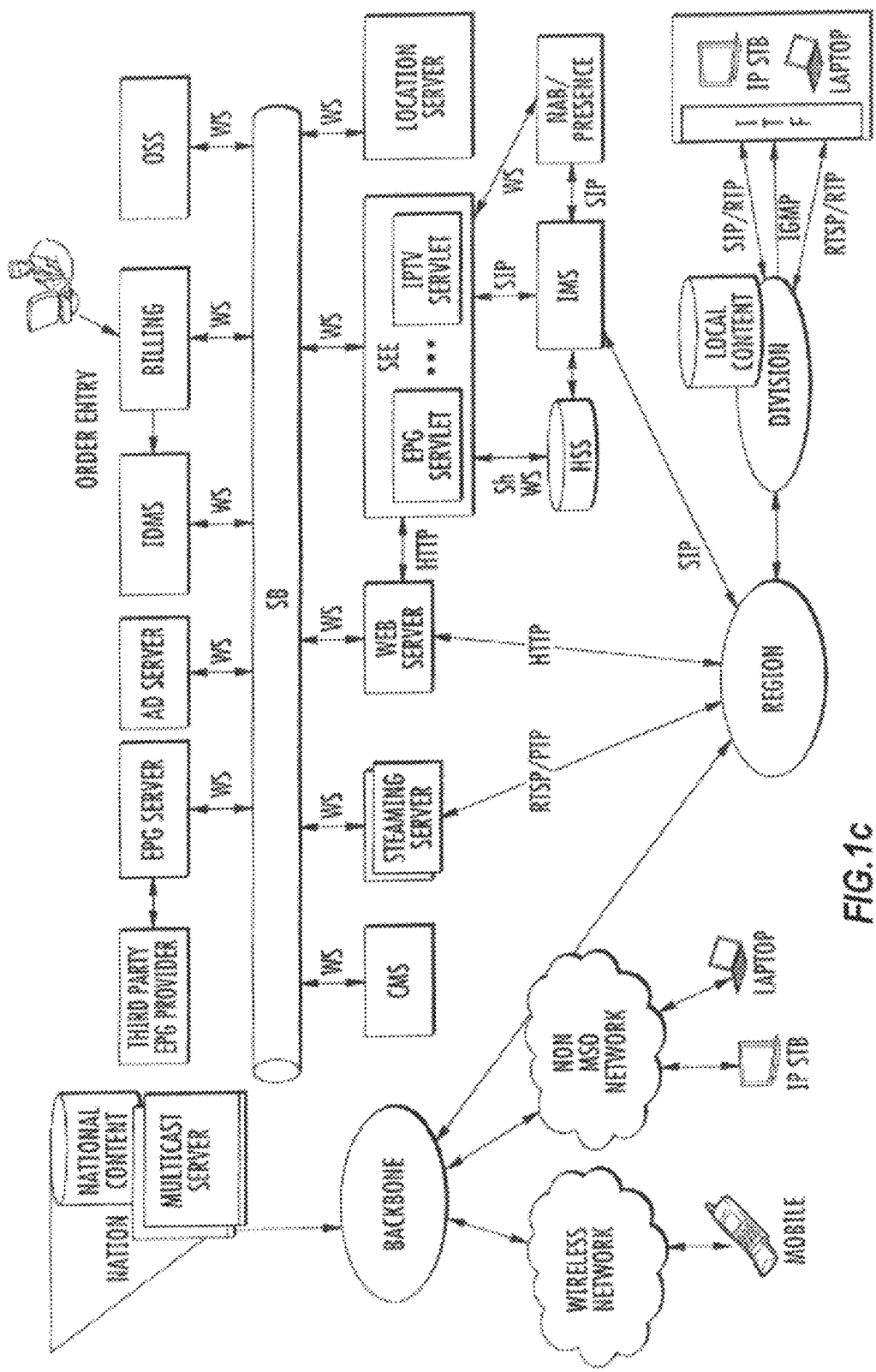
FIG. 1c is a functional block diagram illustrating one exemplary packetized content delivery network architecture useful with the present invention.

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, software images, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Packetized" Networks—

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" distribution network is used for carriage of the packet content (e.g., IPTV content). FIG. 1*c* illustrates one exemplary implementation of such a network, in the context of a 3GPP IMS (IP Multimedia Subsystem) network with common control plane and service delivery platform (SDP), as described in U.S. patent application Ser. No. 12/783,388 filed on May 19, 2010 and entitled "METHODS AND APPARATUS FOR PACKETIZED CONTENT DELIVERY OVER A CONTENT DELIVERY NETWORK", which issued as U.S. Pat. No. 8,516,529 on Aug. 20, 2013 and is incorporated herein by reference in its entirety. Such a network provides significant enhancements in terms of, inter alia, common control of different services, implementation and management of content delivery sessions according to unicast or multicast models, etc.; however, it is appreciated that the various features of the present invention are in no way limited to any of the foregoing architectures.

Exemplary Network Architecture Using a Cable Modem—

Figure 2A:
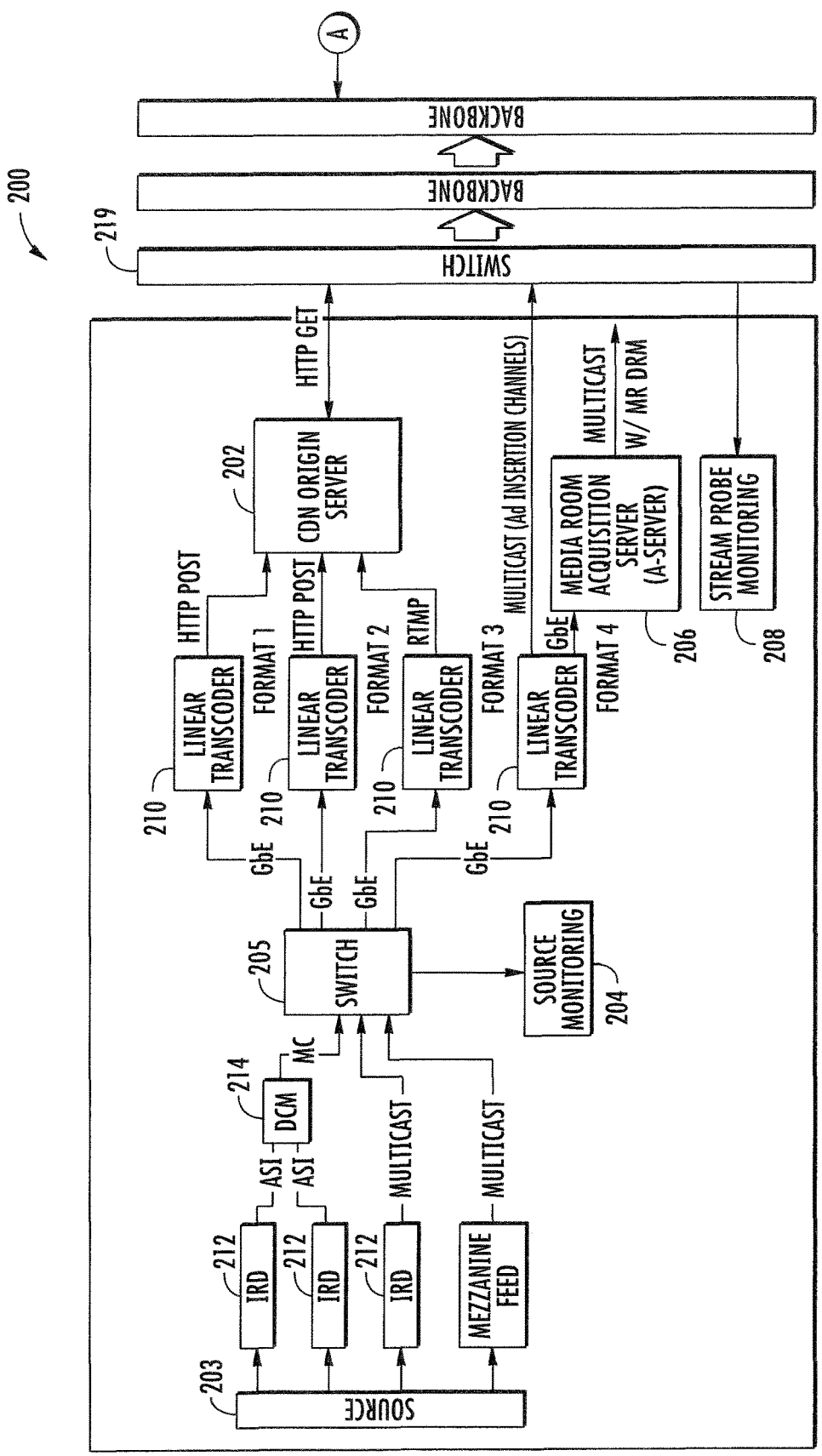
FIG. 2a is a functional block diagram illustrating an exemplary embodiment of a modem apparatus for use in providing content to an IP-enabled device in the architecture of FIG. 2.
Figure 2B:
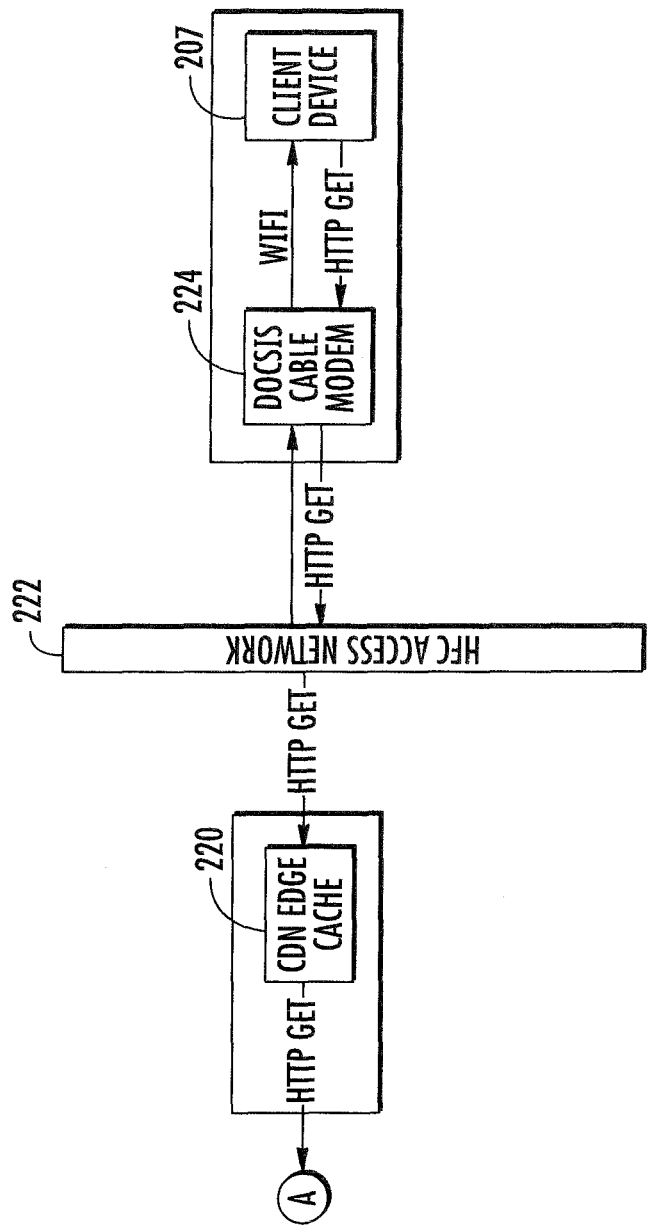
FIG. 2 is a functional block diagram illustrating one exemplary embodiment of a content distribution network architecture for providing content to an IP-enabled device according to the present invention.
Figure 2C:
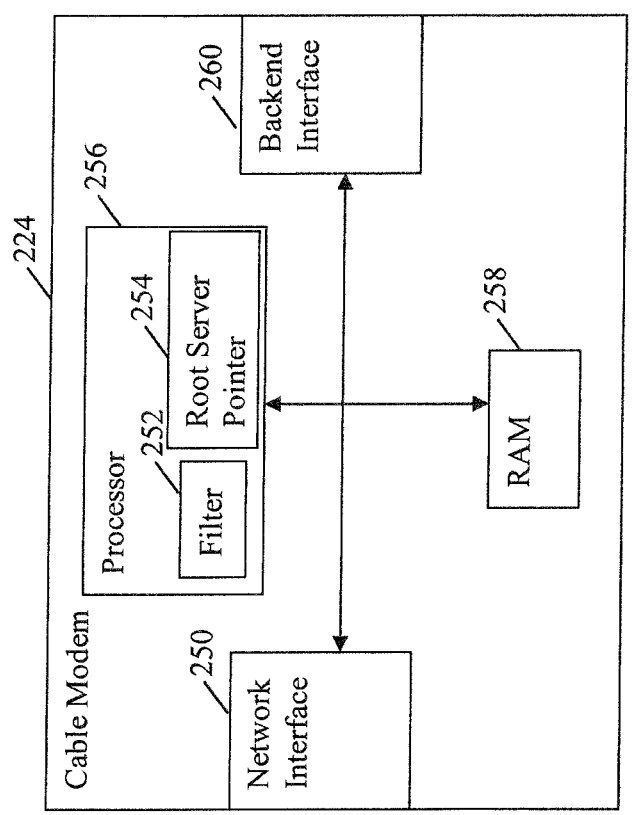

Referring now to FIG. 2, an exemplary embodiment of a network architecture 200 for providing content to an IP-enabled client device 207 in a content distribution network according to the present invention is illustrated. It will be appreciated that the architecture 200 of FIG. 2 can be used in conjunction with any of the foregoing network content distribution architectures (i.e., those of FIGS. 1-1*c* discussed supra), or can form the basis of its own distribution and delivery architecture.

Additionally, the architectures and systems discussed in previously referenced co-owned U.S. patent application Ser. No. 13/403,802 filed on Feb. 23, 2012 and entitled "APPARATUS AND METHODS FOR PROVIDING CONTENT TO AN IP-ENABLED DEVICE IN A CONTENT DISTRIBUTION NETWORK", which is incorporated herein by reference in its entirety, may be utilized in conjunction with the present invention as well.

As illustrated in FIG. 2, content is provided from a national headend content source 203 to a series of integrated receiver/decoders (IRD) 212 of the content distribution network. The content comprises for example, live streaming content, although other types of content or data may be readily distributed. The IRDs 212 receive and decode the content. A digital content manager (DCM) 214 manages transmission of the decoded content from at least some of the IRDs 212 to a network switch 205. The DCM 214 monitors the encoded video to ensure it was successfully encoded from the IRD. As discussed previously, video is transcoded down from a mezzanine quality down to e.g., MPEG-4. The DCM 214 of the illustrated embodiment monitors the decoding of the high quality satellite feed prior to transcoding. In one embodiment, one or more IRDs 212 utilize an asynchronous serial interface (ASI) for transmission of content and other data to the DCM 214. Additionally, content is multicast from the IRD 212 and/or a mezzanine feed 217 directly to the network switch 205. This occurs for example, in the instance that the output from an IRD is already encoded properly; i.e., it will not need to be processed, converted and/or monitored by the DCM 214. Alternatively, this may enable advertisement insertion or multi-room (or so-called "media-room") functionality.

The network switch 205 provides the received and decoded content to a plurality of linear transcoders 210 via e.g., a Gigabit Ethernet (GBE) or 10 Gigabit (10 G) connection. The network switch 205 provides data to a source monitoring entity 204, which monitors the capacity of the switch.

The linear transcoders 210 receive the content from the network switch 205, and perform the necessary adaptive and/or non-adaptive rate steps to transcode and/or transrate content to any number of different desired formats such as e.g., Microsoft® Smooth Stream™ (MP4), Apple® Live Streaming™ (MP4), and Adobe Streaming®, for distribution of this content as a linear broadcast (multicast). As is well known, the exemplary MP4 format is a container format which allows, inter alia, combination of different multimedia streams (e.g., audio and video) into a single file. MP4 is a file extension for the container format defined in the Systems Part of the MPEG-4 standard (ISO 14496-1), incorporated herein by reference in its entirety. MP4 supports different kinds of multimedia content (multiple audio streams, video streams, subtitle streams, pictures, etc.) and advanced content (also referred to as "Rich Media" or "BIFS") such as 2D and 3D graphics, user interactivity, and DVD-like menus. MP4 is a (linear) streamable format.

Although not illustrated, the linear transcoders 210 may perform the necessary rate steps to transcode/transrate the received content into any number of transport streams or streaming protocol, the foregoing being merely illustrative of the general concepts and of the common protocol used by typical IP-enabled client devices 207.

The transcoded and/or transrated content is provided to a content distribution network (CDN) origin server 202 using e.g., Hypertext Transport Protocol (HTTP) POST request methods, Real-Time Messaging Protocol (RTMP), or any other appropriate protocol. As will be discussed in greater detail below, the CDN origin server 202 stores the content to service requests from the IP-enabled devices 207.

One or more transcoders 210 may also be used to transcode the content to MP4 in MPEG-2 transport stream (TS) format in a non-rate adaptive manner. The non-rate adaptive format may be used in this case because the stream has a constant bit rate (CBR) at this stage. Utilization of the MPEG-2 TS container enables the MP4 content to be multicast to a plurality of devices on the network. Additionally, the MPEG-2 TS content may be delivered with advertisement or other "secondary" content inserted therein via one or more intermediary advertisement insertion mechanisms (not shown). Exemplary apparatus and methods for selection of secondary content to be inserted (e.g., via a "targeted" approach) are described in co-owned and co-pending U.S. patent application Ser. No. 11/186,452 filed on Jul. 20, 2005 and entitled "METHOD AND APPARATUS FOR BOUNDARY-BASED NETWORK OPERATION", U.S. patent application Ser. No. 12/284,757 filed on Sep. 24, 2008 and entitled "METHODS AND APPARATUS FOR USER-BASED TARGETED CONTENT DELIVERY", which issued as U.S. Pat. No. 9,071,859 on Jun. 30, 2015, and U.S. patent application Ser. No. 12/766,433 filed on Apr. 23, 2010 and entitled "APPARATUS AND METHODS FOR DYNAMIC SECONDARY CONTENT AND DATA INSERTION AND DELIVERY", each of which is incorporated herein by reference in its entirety, although other approaches may be used with equal success.

As shown in FIG. 2, one or more transcoders 210 may also be used to deliver (via e.g., multicast) one or more channels carrying advertising or other secondary content directly to one or more downstream nodes (e.g., switches 219) for subsequent insertion at a downstream location; i.e., at the switch 219 or further downstream).

Content and data are additionally provided from the MPEG-2 TS linear transcoders 210 to an acquisition server (A-server) 206. Then, via the A-server 206, the content is multicast to a plurality of other devices including those having IPTV server platform with digital rights management (e.g., the Microsoft MediaRoom® platform or MR DRM) options available. The content is provided from the A-server 206 to the switch for eventual delivery to consumers.

Another monitoring entity 208 is also provided as part of the exemplary architecture 200. In one embodiment, this entity 208 comprises a Cheetah Technologies® Stream Probe™ monitoring entity, although it will be recognized that other solutions or technologies may be employed with equal success. The monitoring entity in the exemplary embodiment provides analysis of IP and MPEG video coding layer attributes, in order to ensure network transmission trends and events are reported. In this manner, the network 200 can detect impairments and degradations in real-time. Generally, the monitoring entity 208 uses information fed back from the switch(es) 219. The monitoring entity 208 uses this information to monitor transcoded MPEG-4 content after it has been transcoded or down-sampled.

The illustrated network architecture 200 of FIG. 2 depicts content delivery to an exemplary IP-enabled client device 207. As shown, the device 207 is configured to receive content via a WLAN (e.g., Wi-Fi) or other interface to WLAN-enabled DOCSIS cable modem or gateway 224 using an HTTP GET command. The use of a substantially ubiquitous protocol/request mechanism such as the aforementioned HTTP GET command advantageously allows a variety of different user device types to interface with the modem/gateway 224. Specifically, the modem/gateway 224 can, in the illustrated embodiment, merely pass the user device-originated GET command upstream to the origin server 202 without any conversion or translation of the command. It will be appreciated by those of ordinary skill that such translation can be utilized if desired, such as where the indigenous protocol of the requesting user device 207 does not support the same request/delivery protocol as the origin server 202.

The cable modem 224 in turn requests the content (using an HTTP GET command) from a CDN edge cache 220 which is disposed at or near the edge of the network. In one variant, the modem 224 is placed at the switch 219, or elsewhere in the network based on operational considerations.

The edge cache 220 rests at the edge of the network, and is accessible via a bearer network (e.g., HFC network) access network interface 222. The HFC access network interface 222 in one exemplary embodiment comprises a web services interface managed by the content distribution network 200. The edge cache 220 requests content (using e.g., an HTTP GET command) from the origin server 202 further upstream in the network.

Alternatively or in addition, the edge cache 220 may store popular content for provision to the cable modem 224 and requesting device 207 more efficiently. In one variant, the methods and apparatus discussed in co-owned U.S. patent application Ser. No. 11/726,095 filed on Mar. 20, 2007 and entitled "METHOD AND APPARATUS FOR CONTENT DELIVERY AND REPLACEMENT IN A NETWORK", which is incorporated herein by reference in its entirety, may be utilized for identifying and storing content at the network edge (such as at the edge cache 220). As discussed therein, a peer-to-peer architecture is utilized to provide acquisition, delivery, and reconstitution of content present within the network. The approach described therein has many potential benefits including, for example, the ability to push at least some network bandwidth consumption out to the edge of the network (e.g., hubs or other distribution nodes), thereby conserving bandwidth at the core of the network, the latter which can often be the most critical or bandwidth constrained portion of the system. Moreover, requests outside the MSO network are in some cases obviated, thereby conserving resources in this regard. Latency can also be reduced in some cases (e.g., where the network is oversubscribed), since the requested content is acquired and distributed locally versus having to come from the core (or a third-party content source routed through the core or other network infrastructure).

In another variant, the apparatus and methods of co-owned U.S. patent application Ser. No. 11/904,375 filed on Sep. 26, 2007 and entitled "METHODS AND APPARATUS FOR CONTENT CACHING IN A VIDEO NETWORK", which issued as U.S. Pat. No. 8,561,116 on Oct. 15, 2103 and is incorporated herein in its entirety, may be utilized consistent with the present invention to provide "intelligent" caching and de-caching of content within the network using on-demand or other user-specified delivery mode. As discussed therein, the "intelligent" caching addresses issues relating to the trade-off between content storage space and transcoding/transrating/transcripting efficiencies within the system that occur as a result of trying to support a broad range of end-user device profiles and capabilities. By evaluating the demand for certain content elements and/or encoding formats and rates within the network, and identifying "duplications" of requests (or alternatively, the "proximity" of one request to another in content/encoding/bitrate/encryption space), a caching controller is able to dynamically balance caching of multiple versions of a content element (e.g., movie) and the need for "on the fly" transcoding/transrating/transcription and associated assets. In this fashion, greater efficiencies and economies of scale in operating the network can be realized while simultaneously supporting a wide range of devices. Thus, content which is requested more often can be "intelligently" stored at a content cache at the network edge, such as e.g., the edge cache 220 of FIG. 2 herein.

Referring back again to the cable modem 224 utilized herein the embodiment of FIG. 2, it is noted that the modem 224 is configured so as to only point to the origin (root) server 202 or other servers in the content distribution network. That is, the cable modem 224 is limited to only retrieve content for delivery to the IP-enabled devices from one or more specific servers (here, associated with a specific range or block of "available" IP addresses). In addition, the cable modem 224 may be configured to filter or block traffic from an IP-enabled device 207 which is not directed at retrieving content from the root server 202 or other authorized entity. These and other features of the cable modem 224 are illustrated in, and described in greater detail with respect to, FIG. 2a.

As shown in FIG. 2a, the cable modem 224 generally comprises a network interface 250 for interfacing with the edge cache 220 and other entities of the network 200. In the exemplary embodiment, the network interface 250 comprises a DOCSIS modem configured to interface with an HFC network (such as that described above) via radio frequency channels or QAMs.

The cable modem 224 further comprises a plurality of back end interfaces 260 for communication with one or more client devices 207 and CPE. Exemplary backend interfaces may include e.g., Wi-Fi, Bluetooth, Ethernet, IEEE 1394, Thunderbolt™, etc. In the exemplary implementation, a Wi-Fi (e.g., 802.11g) interface is used to communicate with an indigenous Wi-Fi interface in the client device, thereby affording the user significant mobility within/near the premises. The Wi-Fi interface also affords sufficient bandwidth so that the client device (e.g., tablet computer or other video rendering device) can render the streamed media linearly and without any artifact (e.g., pauses for buffering, jerkiness, etc.).

The cable modem 224 further includes a processor 256 and associated memory (e.g., RAM) 258. The processor 256 of the cable modem 224 is configured to run various applications, including for ensuring the security of the content transmitted via the cable modem 224. In one embodiment, the cable modem 224 runs also includes software to monitor outbound communications (the so-called origin or root server "pointer" software 254), and software to filter or block requests from the client devices 207, or conversely to block delivery of data or content from impermissible IP addresses (the so-called "filter" software 252). It will be appreciated by those of ordinary skill that while the foregoing pointer and filter software is shown and described as two separate software programs (e.g., middleware, or applications), the functionality of both can be combined into a single program if desired.

Moreover, the filter and pointer functions can be linked or dependent, such as where the filtering algorithm is only applied if the pointer application has not been invoked by the user/user device 207. For example, if a user is attempting to access content from the MSO origin server via an MSO-supplied application on the client device 207, selection of a content element via say a menu of the MSO application would invoke the pointer routine of the modem 224 to generate an appropriate pointer (e.g., IP address) within the permissible address range/space. The "pedigree" of this address is in one variant presumed, and hence filtration would not be required. However, contrast the foregoing with the case where the user utilizes an indigenous or non-MSO application (e.g., a third-party browser) on the client 207 to select a URL or IP address; this was not generated by the MSO application and does not invoke the pointer routine, and hence it's pedigree is unknown. Under such cases, the filtering routine would automatically be invoked (and would block any attempted accesses outside the permissible address range/space). Identification of MSO-versus non-MSO application/pointer origination can readily be accomplished, such as for example via embedding data within the request that uniquely identifies the MSO-application as "authentic", and/or logic which alerts the filter routine that the pointer was not used in formulating the communication.

Alternatively, the filter routine can simply be configured to filter every request as to its address range/space, irrespective of origin of the request and/or use of the pointer.

The root server pointer program 254 provides the modem with appropriate information to ensure that communication from the cable modem 224 is only performed with acceptable entities within the MSO network (e.g., the appropriate origin (root) or distribution server(s)). In one exemplary embodiment, the cable modem 224 only points at the root server or a CDN origin server 202, and the necessary infrastructure and entities for providing content to IP-enabled client devices 207 in communication therewith (which includes the origin server 202, edge cache 220, DNS server, etc.). This is accomplished in one embodiment by defining a range of contiguous IP address space (which may also be distributed across multiple data centers) with which the modem 224 must communicate. In this manner, when a communication is to be sent, the root server pointer 254 provides the destination address within the known (permissible) address space for effecting the desired action (e.g., obtaining a program guide or content). Therefore, the cable modem 224 will only enable communication with devices having an IP address in the defined space. For example, the CDN root server 202, the edge cache 220, application servers, etc. which may be needed for delivery of content to the IP-enabled client devices 207 are each given an IP address within the defined address space. Additionally, other entities required for cable modem 224 functioning may be given IP addresses within the defined space (i.e., management entities). In one variant, the permissible address range is static, and hence communications needed to update the range are largely if not totally obviated, and the modem 224 can be pre-programmed for these addresses if desired.

In another embodiment, the root server pointer application 254 is given a list of appropriate IP addresses corresponding to those entities with which communication is permitted, which is non-contiguous. According to this embodiment, the network 200 does not need to create a contiguous IP address space; updated IP addresses as new entities are added, replaced, etc. are provided to the cable modem 224 periodically or as needed.

The filter program 252 comprises a set of instructions which, when run on the cable modem 224, block communication from a client device 207 to entities other than the designated server entities of the network 200. The filter 252 may also be configured to block "inbound" communications (i.e., from the network inbound to the premises) that originate from non-approved IP addresses. In one embodiment, the filter 252 is configured to block traffic originated by the client device to address spaces other than those permissible within the delivery network (i.e., the origin server 202, edge cache 220, etc.). This may be accomplished using the previously discussed contiguous IP address spaces, or the list of known addresses.

Therefore, when the client device 207 connects to modem 224, it is permitted to access all the services on the network necessary to obtain an IP address for itself (if required), access the domain name system (DNS) server (which is within the predetermined specific IP address space), etc. In addition, the cable modem 224 can resolve the host name, URL, CDN, etc. and can access content by logging onto the application server, obtaining the UI (e.g., navigator or EPG if not already present on the client device), and accessing the root server to populate the EPG and allow the user to select content.

However, if the client device 207 attempts an "out of range" communication (e.g., the user starts up a browser application and tries to access a URL that corresponds to an IP address other than within the predefined IP address space), the communication will fail. That is, traffic/packets sent to addresses other than those approved addresses are blocked at the cable modem 224 via the filter 252. The filter 252 also optionally acts as both an inbound filter, hence communications received from non-permissible IP addresses will not be passed to the client device 207.

In addition, the filter 252 may serve as a DNS block. Accordingly, the filter 252 in such cases denies access to all domains or URLs (e.g., www.xyz.net) other than those specified by the network. The DNS block may be used in conjunction with or in place of the IP address block discussed above.

As an alternate or additional protection mechanism, the DNS server to which communication is permitted (e.g., is within the permissible range of addresses) may be set up to only resolve IP addresses to services needed to deliver the content to the IP-enabled devices 207. Hence, even if an impermissible request escapes the filter 252, the server will not resolve the address.

In certain use cases (such as e.g., where a MSO network user or subscriber is using the client device 207 to also access broadband data services via a third-party carrier or service provider) the foregoing mechanisms for ensuring protection of communications between the network 200 and client devices 207 may require that a client device 207 requesting access to content disconnect from a first wireless service set identifier (SSID) associated with the third-party carrier, and switch to that of the cable modem 224 (and hence the MSO network). When the client device 207 switches to the SSID of the cable modem 224, the only functions which may be performed on that device 207 are those of obtaining content as discussed above.

For instance, if a user seeks access to the herein-described MSO-based content delivery services via Wi-Fi on an iPad where the device is currently associated to a non-MSO Wi-Fi access point SSID, the client must access the cable modem SSID (such as by starting a content request application associated with the MSO which uses the cable modem SSID, and accessing the MSO network via the cable modem's 224 SSID port, or alternatively reconfiguring an already running application to access the cable modem SSID, such as by manually entering or selecting that SSID in a drop down menu).

Exemplary Network Architecture Using a Media Server—

Figure 3:
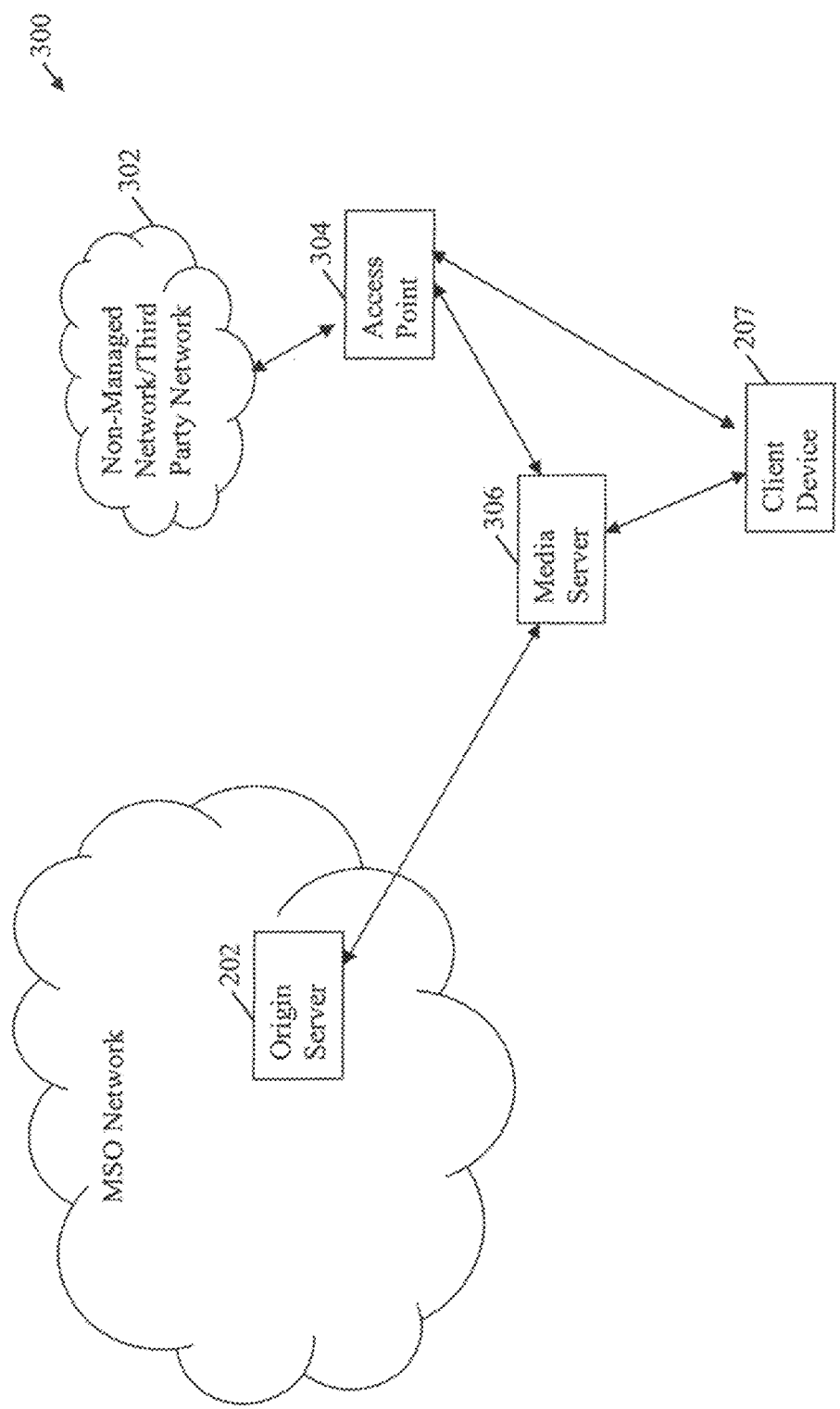
FIG. 3 is a functional block diagram illustrating another exemplary embodiment of a content distribution architecture for providing content to an IP-enabled device according to the present invention.

Referring now to FIG. 3, another exemplary network architecture 300 for providing content to IP-enabled client devices 207 is given. The architecture of FIG. 3 obviates the "SSID switching" set forth above, thereby enabling the user to access additional networks simultaneously more seamlessly and with better user experience.

Although not shown, the MSO network portion of the exemplary network 300 contains apparatus similar to those discussed above with respect to the network 200 of FIG. 2. Accordingly, content is provided from a national headend content source. The received content is decoded (via one or more IRDS). A management entity manages transmission of the decoded content from at least some of the IRDs to a network switch. The network switch provides the received and decoded content to a plurality of linear transcoders which perform the necessary steps to transcode and/or transrate content to one or more desired formats. The transcoded and/or transrated content is then provided the origin server 202. The content is further segmented and a playlist created at either the transcoders or origin server 202 (as discussed elsewhere herein). IP-enabled devices 207 access the content from the origin server 202 using e.g., Hypertext Transport Protocol (HTTP) GET request methods, Real-Time Messaging Protocol (RTMP), or any other appropriate protocol.

Although not illustrated, an edge cache may be positioned at the edge of the MSO network. The edge cache may be utilized to request content (using e.g., an HTTP GET command) from the origin server 202 further upstream in the network. This allows content to be pushed to the edge of the network (i.e., to the cache) for faster and more efficient delivery therefrom.

The origin (root) server 202 and/or edge cache are accessible via a bearer network (e.g., HFC network) access network interface. The HFC access network interface in one exemplary embodiment comprises a web services interface managed by an MSO.

In the network 300 architecture of FIG. 3, the client device 207 receives broadband Internet services from a non-managed or third-party managed network 302 (e.g., a DSL modem/telephony line, optical fiber (FTTC, FTTH) network, etc.) via a third-party provided access point 304. In order to receive content from the managed (MSO) network, a modem (functioning effectively as a media server) 306 associated with the MSO network is provided. The modem 306 includes an interface for communication with the MSO network (such as a DOCSIS modem for communicating via DOCSIS or "in band" QAMs within an MSO cable television network, or a WiMAX or other wireless broadband MAN/WAN transceiver), and is configured to register as a client (or connected device) of the third-party provided access point 304 via an interface 323 therewith. In this manner, the access point 304 merely views the media server modem 306 as a device associated with the third-party access point 304 and which is able to communicate therewith. The communication between the modem 306 and the access point 304 may be direct (e.g., via direct wired or wireless link, such as Wi-Fi or an Ethernet cable), or alternatively via a premises network such as e.g., a CAT-5, MoCA, WLAN, or other such arrangement. The modem 306, in a manner similar to that discussed above, is identified by the content distribution (MSO) network and therefore able to receive requested content from the distribution network via the aforementioned interface. In other words, rather than using a cable modem 224 associated with the MSO network as a wireless access point for the client device to access the MSO network (as shown in FIG. 2), the modem media server 306 of FIG. 3 acts as a client of the third-party access point 304, as does the user's client device 207 (e.g., tablet computer). The media server modem 306 thus obtains an IP address from the access point 304 in the same fashion as any other device associated with the access point (or home network) would receive one. However, the modem 306 provides a separate backhaul over the managed network via e.g., the HFC DOCSIS channels or other communication channels.

Figure 3A:
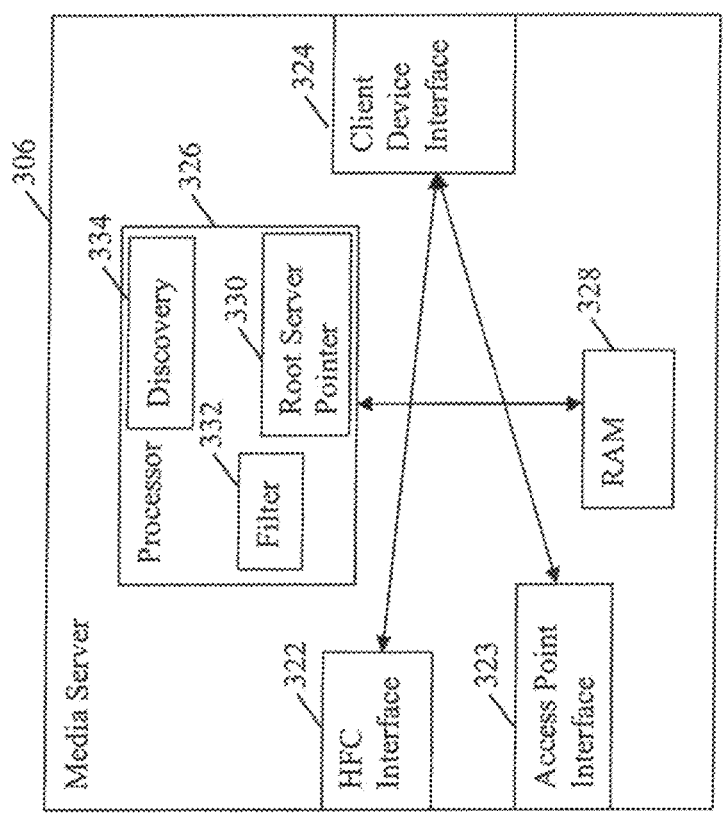
FIG. 3a is a functional block diagram illustrating an exemplary embodiment of a media server for use in providing content to an IP-enabled device in the architecture of FIG. 3.

FIG. 3a illustrates an exemplary embodiment of a "media server" modem 306 for use with the network architecture 300 of FIG. 3. In one embodiment, the media server 306 comprises a modem capable of interfacing with the MSO network as discussed elsewhere herein (e.g., DOCSIS cable modem, WiMAX transceiver, etc.). In particular, the media server modem 306 comprises at least two network interfaces, a first interface 322 for communicating with entities of the managed (MSO) network, and a second access point interface 323 for communicating with the third-party managed access point 304. In the illustrated embodiment, the second interface 323 comprises a wired or wireless high-bandwidth connection (e.g., Ethernet/CAT-5/CAT-6, Wi-Fi, IEEE Std. 1394, Thunderbolt, etc.) which permits streaming of the media received via the first interface 322 to the access point 304, and accordingly to the client 207 via a wired or wireless link 315 between the access point and client 207. In one variant, the link 315 and the second interface 323 comprise a common link, thereby simplifying construction of the access point 304. For instance, once such implementation uses a common Wi-Fi interface to communicate with the client 207 and the media server modem 306, with the access point 304 operating as a Wi-Fi AP (Access Point), and the modem 306 and client 207 as respective stations (STAs). Yet other configurations will be appreciated by those of ordinary skill given the present disclosure.

The media server 306 may further comprise one or more interfaces 324 for communicating to client devices 207 (not shown), for example to enable operation such as that described previously with respect to FIG. 2 (e.g., as an alternate or backup mode to that described below).

Additionally, the media server modem 306 comprises a processor 326 and associated memory such as RAM 328. The processor is configured to run a root server pointer application 330, which is adapted to enable the media server modem 306 to only communicate with particular entities of the managed network (including e.g., the origin/root server 202).

As discussed above with respect to FIG. 2a, the root server pointer application 330 ensures that communication from the media server modem 306 is only exchanged with authorized entities. In one exemplary embodiment, the media server modem 306 only points at the origin server 202 (and optionally other necessary infrastructure and entities for providing content to IP-enabled client devices 207 in communication therewith). This functionality is in one variant accomplished by defining a range of contiguous IP address space to be distributed across the network entities with which the media server modem 306 must communicate, or alternatively by providing a list of the IP addresses thereof to the media server modem 306. In this manner, when a communication is to be sent, the root server pointer 330 provides the destination address for a communication within the known or permissible address space or list. This enables the modem 306 to access the desired origin or other network (e.g., CDN) server to obtain the desired content elements.

The processor 326 is further configured to run a filtering program 332, which filters communications received thereat from either the client device 207 (outbound) or entities of the managed network (inbound). The filter application 332 blocks communication from a client device 207 to entities other than the designated server entities of the network using the previously referenced contiguous address spaces or the list of approved IP addresses; i.e., the filter 332 blocks traffic to address spaces other than those known to the system as identified as being permissible within the delivery network (i.e., the origin server 202, edge cache 220, etc.). Similar to the filter application of the cable modem 224 of FIGS. 2-2a, the filter application 332 of the media server modem 306 of FIG. 3 enables the client device 207 to perform only those necessary tasks for requesting and receiving content (via the media server modem 306) and blocks any other traffic. Thus, the client device 207 will be unable to transmit or receive content from anywhere other than the predefined address spaces (or known addresses).

Notwithstanding, the client device 207 of the embodiment of FIGS. 3-3a is still able to communicate with entities other than those specified by the network via its connection to the third party-access point 304 of the unmanaged network 302. In this manner, the client 207 will not be required to switch back-and-forth between the SSID of the access point 304 and the managed network associated device (media server modem 306). Instead, the client device 207 can simultaneously receive services from both the managed and unmanaged networks. That is, streaming of MSO-originated content to the IP device 207 proceeds over the media server modem 306 connection 322, while other data services (e.g., broadband data, such as for browsing the Internet) use the access point 304 and its interface to the third-party network (e.g., DSL modem, optical fiber drop, satellite modem, etc.). Therefore a more integrated customer experience is provided, while still ensuring that the appropriate security is applied to the MSO streamed content.

The processor 326 is in the illustrated embodiment configured to run a publication/discovery program 334, which enables the client device to discover the modem 306 (which is acting as a client of the access point 304), and/or otherwise facilitates communication therewith. A myriad of approaches for providing a predetermined mechanism for the client device (or client application) to discover the gateway, and use it for external communication, may be utilized. In one embodiment, a standards-based solution such as universal plug and play (UPnP), Zeroconf™, etc. may be used. Alternatively, a broadcast or multicast within the home may be utilized to discover the gateway. Each of the foregoing solutions may be implemented without requiring the incumbent AP to natively support the discovery technology. Rather, the AP merely passes the traffic necessary for the above-disclosed protocols to function (which in the case of the standards-based protocols, the AP would indigenously be configured to perform).

Accordingly, in one example, a fiber optic drop (e.g., FTTH, or FIOS) is run into a customer's home to provide high speed data service therein. The media server modem 306 registers as a client of the access point associated with the optical drop; the modem 306 therefore receives an IP address from the access point 304. When the client device 207 runs an application to access the modem (and content at the managed network), the client device 207 discovers (or is discovered by) the media server modem 306. The client device 207 knows the IP address or port of the modem 306, and communicates its requests (e.g., for program guide, content, etc.) to the modem 306 via the AP 304. The media server modem 306 can then facilitate serving these requests via its connection to the MSO network (such as via a DOCSIS or WiMAX connection thereto).

In another embodiment, the "content only" services provided by the MSO described above (i.e., no high speed data) are provided via a wireless broadband or WAN interface, such as a WiMAX (e.g., 802.16e or m) compliant interface. In this fashion, new subscribers to the MSO network need not have any extant or installed cable or fiber "drop" into their premises; the MSO merely provides the new subscriber with a WAN transceiver (base station), which can include a WLAN or similar interface as well to facilitate quick establishment of a completely wireless content delivery system within the subscriber's premises. The installed WAN modem is configured to allow access to only the designated IP address space or list (as previously described). Either the architecture of FIG. 2 or FIG. 3 above can be utilized in this scenario, depending on whether a third-party data service is used at the premises.

Exemplary Network Architecture Using a Network Gateway—

In yet another embodiment, an architecture 400 of FIG. 4 herein is utilized to provide content to IP-enabled devices. Similar to the mechanisms discussed above, content is provided from a national headend content source and decoded (via one or more IRD). A management entity manages transmission of the decoded content from at least some of the IRDs to a network switch. The network switch provides the received and decoded content to a plurality of linear transcoders which transcode and/or transrate content to one or more desired formats. The transcoded and/or transrated content is then provided the origin server 202. IP-enabled devices 207 access the content from the origin server 202 using e.g., Hypertext Transport Protocol (HTTP) GET request methods, Real-Time Messaging Protocol (RTMP), or any other appropriate protocol.

Although not illustrated, an edge cache may be positioned at the edge of the MSO network. The edge cache may be utilized to request content (using e.g., an HTTP GET command) from the origin server 202 further upstream in the network. This allows content to be pushed to the edge of the network (i.e., to the cache) for faster and more efficient delivery therefrom.

The root server 202 and/or edge cache are accessible via a bearer network (e.g., HFC network) access network interface. The HFC access network interface in one exemplary embodiment comprises a web services interface managed by an MSO.

In the embodiment of FIG. 4, the user/subscriber is not limited to utilizing access points which are serviced by an MSO managed network. Rather, the transcoded/transrated and segmented content and playlist are delivered to the IP-enabled device over a non-managed network or third-party managed network 404. A network gateway 402 is utilized to interface the non-managed/third-party managed network 404 to the MSO managed network (e.g., CATV network), such that the network 404 acts as the distribution network or "edge" of the (core) managed network for purposes of distributing the content.

In one such variant, a cellular service provider (CSP) with an LTE (Long Term Evolution) or LTE-A infrastructure for providing high speed mobile data service to its subscribers is the third-party network 404; subscribers of this network 404 use their smartphones or LTE-enabled tablets as video rendering devices for the MSO-originated content. In one implementation, the methods and apparatus of co-owned U.S. patent application Ser. No. 11/258,229 filed Oct. 24, 2005 entitled "METHOD AND APPARATUS FOR ON-DEMAND CONTENT TRANSMISSION AND CONTROL OVER NETWORKS", incorporated herein by reference in its entirety, are used to provide the cross-network functionality, although other approaches may be used with equal success. The MSO origin or root server 202 exists within the permissible IP address space (or list) as previously described. In one implementation, the user device (e.g., smartphone or tablet) includes an MSO application which is configured to, when run on the user device, perform the pointing and filtering functions described supra, such that the user device can only access the requested MSO streamed (e.g., MP4) content after proper login and authentication, and not other services.

In another implementation, the inter-network gateway 402 (described in greater detail below) is equipped to perform these pointing and filtering functions.

The content/playlist is in the embodiment of FIG. 4 literally run "over the top" of the non-managed or third-part managed network 404 (utilizing e.g., the previously discussed .ts segmenting protocol), such as via an IP-based transport (as opposed to the MPEG transport stream of the prior embodiment).

The embodiment of FIG. 4 advantageously provides MSO-network users or subscribers the ability to access IP content via any number of non-managed network access points (e.g., WLAN APs operated by third parties with connection to the Internet via e.g., an ISP, or via a CSP as described above).

In one exemplary configuration, the gateway apparatus 402 of FIG. 4 comprises that discussed in co-owned U.S. patent application Ser. No. 12/834,801 filed on Jul. 12, 2010, entitled "APPARATUS AND METHODS FOR CONTENT MANAGEMENT AND ACCOUNT LINKING ACROSS MULTIPLE CONTENT DELIVERY NETWORKS", and issued as U.S. Pat. No. 9,906,838 on Feb. 27, 2018, which is incorporated herein by reference in its entirety.

In yet another embodiment, the apparatus and methods of co-owned, co-pending U.S. patent application Ser. No. 12/480,597 filed on Jun. 8, 2009, entitled "MEDIA BRIDGE APPARATUS AND METHODS", and issued as U.S. Pat. No. 9,602,864 on Mar. 21, 2017, which is incorporated herein by reference in its entirety, may be utilized. As discussed therein, an apparatus (such as the gateway 402, cable modem 224, and/or media server modem 306) may, in addition to providing content to a plurality of devices (including IP-enabled devices 207) in communication therewith, act as a connection between a portable media device (PMD) such as an MP3 player and a user's home network. This bridging apparatus may be used, for example, to convert content stored on the PMD to a format capable of being presented on a user's set-top box or other client device. Control of the presentation is also provided by the bridging apparatus.

Secure Content Delivery—

Various mechanisms for ensuring the security of content transmitted utilizing the methods and apparatus of the present invention are disclosed in previously referenced U.S. patent application Ser. No. 13/403,802 entitled "APPARATUS AND METHODS FOR PROVIDING CONTENT TO AN IP-ENABLED DEVICE IN A CONTENT DISTRIBUTION NETWORK" filed Feb. 23, 2012.

As discussed with respect to one embodiment therein, an entity associated with the MSO determines whether the requesting user is permitted to access the content. The process by which it is determined whether a user may access content includes: (i) authenticating the user as a subscriber to the MSO, and (ii) determining whether the subscriber's service/subscription level permits viewing of the requested content (and optionally one or more use restrictions).

In one variant, the user is authenticated by requiring him/her to establish a login identity and password, and/or assigning the user a globally unique identifier (GUID). For example, the user's MAC address or IP address may be stored at an MSO entity, and when the user requests content, the user must log into the MSO; the relevant information is retrieved and compared to information that the user has provided in their login. If valid login information is entered (i.e., the information provided matches the stored information for that user GUID), then a session is created between the MSO and user permitting the transmission of content there between.

In another variant, the third party (unmanaged network) service provider and MSO accounts for a particular user may be linked or federated such that a trust relationship is established between them and utilized to verify subscriber information. One exemplary implementation of this arrangement is additionally discussed in co-owned U.S. patent application Ser. No. 12/834,801 entitled "APPARATUS AND METHODS FOR CONTENT DELIVERY AND MESSAGE EXCHANGE ACROSS MULTIPLE CONTENT DELIVERY NETWORKS," filed on Jul. 12, 2010, and issued as U.S. Pat. No. 9,906,838 on Feb. 27, 2018, which is incorporated herein by reference in its entirety.

The determination of whether the subscriber's service/subscription level permits viewing of the requested content may include determining a subscription level of the user (or whether a user has provided consideration to the MSO for gaining access to the content, such as on a pay-per basis), and applying an appropriate filter to the content which can be requested thereby.

In addition, it may also be determined whether the requesting device is within a home network or other premises serviced by the MSO. This may be verified based on the IP or MAC address of the entity used to access the MSO network (such as e.g., the cable modem 224, media server modem 306, and/or gateway 402). Each of the herein-referenced authentication/entitlements checks are discussed in greater detail in the previously referenced U.S. patent application Ser. No. 13/403,802 entitled "APPARATUS AND METHODS FOR PROVIDING CONTENT TO AN IP-ENABLED DEVICE IN A CONTENT DISTRIBUTION NETWORK".

In another embodiment, the aforementioned entitlements check to ensure that the requesting device is behind a recognized cable modem or Wi-Fi hotspot is performed according to the methods and apparatus discussed in co-owned U.S. patent application Ser. No. 12/536,724 filed on Aug. 6, 2009 and entitled "SYSTEM AND METHOD FOR MANAGING ENTITLEMENTS TO DATA OVER A NETWORK", which issued as U.S. Pat. No. 8,341,242 on Dec. 15, 2012 and is incorporated herein by reference in its entirety. As discussed therein, entitlement to content residing on a server is determined by e.g., the computing device operated by a subscriber generating a request for access to a requested content residing on a content access provider server. The subscriber has an account with a multi-channel video program distributor (MVPD) and the account comprises subscription information indicative of the services provided by the MVPD to the subscriber. The content request is received by the content access provider and forwarded to an entitlements server. The entitlements server determines whether the subscriber is entitled to receive the requested content based on the subscription information and sends an access granted message to the content access provider server when the subscriber is entitled to receive the requested content.

In another embodiment, entitlements are determined via a geographic location of an MSO-managed access point (e.g., public Wi-Fi or WiMAX hotspot).

With respect to the transmitted content itself, symmetric or asymmetric encryption techniques, such as e.g., Advanced Encryption Standard (AES) encryption, may be utilized to protect the content. In one embodiment, a single key is used for both encryption and decryption (symmetric-key encryption), although it will be appreciated that non-symmetric or asymmetric encryption techniques may be used as well. According to this embodiment, the content encryption/decryption key is generated and provided to the origin server as discussed in the previously referenced U.S. patent application Ser. No. 13/403,802 entitled "APPARATUS AND METHODS FOR PROVIDING CONTENT TO AN IP-ENABLED DEVICE IN A CONTENT DISTRIBUTION NETWORK". A URL to the content encryption/ decryption key is provided to client device 207 upon request and authentication/authorization thereof.

In order to obtain the encryption/decryption key, in one embodiment, when the client device 207 logs in and is authenticated (see login as discussed above) to the access network, it receives program guide data and an encrypted cookie. In order to request the key, the device 207 presents the server entity (to which the content request is transmitted) with the previously received cookie (after it is decrypted). The key server can then determine whether the cookie presented is appropriate for the requesting device, such as by cross-checking the cookie-device pair against stored information and once authorized, provide the key thereto. Once the AES key is obtained in the clear, the client device 207 may then use the key to decrypt and play the content fragments which correspond to those listed in the playlist of the requested content.

In yet another embodiment, content may be secured using the methods and apparatus of co-owned, co-pending U.S. patent application Ser. No. 12/901,417 filed on Oct. 8, 2010 and entitled "APPARATUS AND METHODS FOR ENFORCING CONTENT PROTECTION RULES DURING DATA TRANSFER BETWEEN DEVICES". As discussed therein, a content server (such as e.g., the origin server, edge cache, or other entity of the herein described network architectures) is utilized to determine not only copy protection rights (such as those utilized by the well known Digital Transmission Content Protection-Internet Protocol (DTCP-IP)), but also the rights of specific requesting subscribers to access, use, copy, and/or distribute content. These rules are provided to, and implemented by, a subscriber device requesting specific content (such as e.g. an IP-enabled client device 207, cable modem 224, media server 306, and/or gateway 402). The subscriber device implements the protection rules when determining how the content may be used, and whether the content may be provided to subsequent devices.

In one further embodiment, the subscriber device is configured to enable content to be provided to second devices (such as other devices within the home network, including e.g., IP-enabled client devices 207) consistent with the protection rules by generating a mobile or transferable version of content, and providing this version to the requesting device. To avoid having multiple available versions of the same content existing at both the (source) subscriber device and the target device to which the subscriber transferred the content, the subscriber device employs in one variant a mechanism for marking the original content stored thereon so that it is unavailable for use or further transfer while the mobile version exists at the target device (i.e., so-called "check out"). In this manner, there is at any one time only one available or useable version of the content for the given subscriber. The subscriber may reinstate the original version of the content at the subscriber device (i.e., so-called "check in") in order for it to be used thereon, or to be transferred to yet another device. Reinstatement is accomplished in one implementation by deleting the version existing at the first target device, and transmitting a signal or message back to the subscriber device indicating that the copy has been deleted. This transmission then causes the subscriber device to "unblock" the original version of the content as stored thereon.

The client device responsible for implementing and/or enforcing the protection rules (e.g., the cable modem 224, media server modem 306, and/or gateway 402) may also work within a premises network or trusted domain for media content, thereby allowing a subscriber total mobility in the premises network. For example, media content from the client device may be accessed via extant networks (e.g., MoCA, Ethernet, Wi-Fi, or PAN) for distribution to any STB, PC, mobile device, or other PMD in the network. The client device may also utilize the existing premises network to allow other devices to share media content with it.

Methodology—

Figure 5:
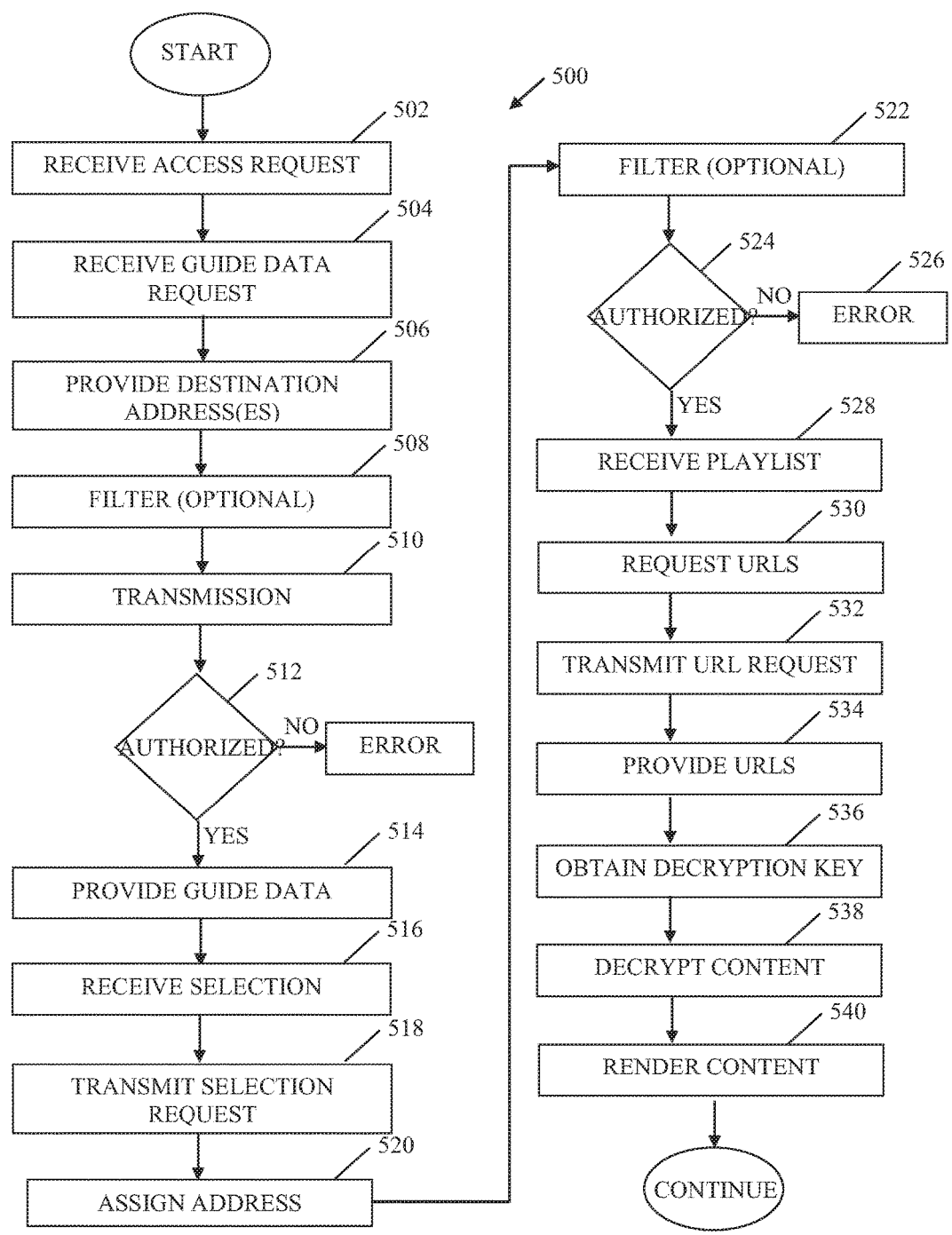
FIG. 5 is logical flow diagram illustrating one embodiment of a method for providing content to an IP-enabled device via a content distribution network according to the network architecture of FIGS. 2-2a herein.

Referring now to FIG. 5 an exemplary method 500 for providing content to an IP-enabled device 207 via a content distribution network such as that illustrated in FIG. 2 is disclosed. As illustrated, per step 502 of the method 500, a request to access content is received at e.g., the cable modem 224 from a requesting IP-enabled client device 207. In one embodiment, the request is received after the user initiates a software application on the client device 207 (e.g., MSO provided "app", or alternatively a non-MSO specific application such as a browser which links to a user login web page within the authorized address space), and logs on to the service. Various exemplary login scenarios and models are described subsequently herein.

Once the login is complete and the user's identity verified (such as by login ID, password, etc.), a request to access a content list or guide data may be manually or automatically sent from the device 207 to the cable modem 224 per step 504.

At step 506, the cable modem 224 provides the destination address(es) of the communication to provide proper routing and to ensure that it is within a set of known IP addresses and/or within a pre-defined contiguous IP address space. In the present example, the provided address would correlate to a guide data server (which may be the origin server, or another server within the network) that is within the permissible address range/space.

At step 508, filtration is optionally applied based on, e.g., whether the request is generated by the MSO application (and the pointer routine is invoked to provide the address). See discussion of various embodiments of filtering logic provided supra.

Assuming that the communication is not filtered, it is sent to the prescribed address to obtain the guide data per step 510. Upon receipt of the request, a check is performed (step 512) to ensure that the requesting device is authorized or entitled to receive content. In one embodiment, one or more of the aforementioned authorization or entitlement checks may be utilized. For example, it may be determined that the client device 207 is registered to a user of the system, that the device 207 is behind an MSO-managed cable modem 224, and/or that the user associated to the device 207 is a subscriber to the appropriate services of the MSO. This is accomplished using various combinations of IP address (i.e., of the cable modem 224), the MAC of the cable modem and/or client device 207, and the user login data (e.g., login ID and password). An "entitlements" database may also be accessed based on the foregoing information to determine if the user is entitled to receive the requested content/services (here, only guide data). A further processing step may also be applied at this level to filter the MSO-managed content, so as to identify only that content to which the subscriber is authorized to have access. If the user/device is not authenticated/authorized/entitled to access the guide data (and subsequently content), an error message will be presented to the user/device.

Assuming proper authentication, per step 512, an electronic program guide (EPG) or other data reflecting available content is provided to the requesting device 207 via the cable modem 224 (step 514). As noted above, the guide data may be filtered to take into account the specific authorization/entitlements of the requesting client device 207 or user.

Per step 516, a user selects one or more content elements from the provided guide or index, thereby causing a request for that particular one or more content elements to be transmitted to the cable modem 224 (for eventual communication to the origin server or edge cache) per step 518. The cable modem assigns a permissible address to the request (step 520), and filters the communication if required (step 522).

At step 524, it is determined whether the requesting device 207 or user is authorized to receive the requested content. However, it is appreciated that the present step may be obviated in favor of providing the filtered guide data discussed above (or otherwise verifying the user's entitlement to access the requested content as part of an earlier step). If the device or user is not authorized, an error message is provided thereto (step 526).

An authorized client device 207 will receive the playlist of URL addresses for the content segments associated with the requested content at step 528. It is noted that at this step the device may further receive a URL to the content decryption key (as discussed elsewhere herein). In response to receiving the playlist, the device 207 uses the playlist URLs to request the various content segments needed to render the desired content (step 530). The URL requests are received and optionally filtered by the cable modem 224. If the requests are addressed to unknown/unauthorized recipients, they are blocked.

Appropriately addressed URL requests are transmitted to the edge cache or origin server and the requested content provided to the device per step 532. Per step 534, each of the URLs in the content playlist are requested and provided. Although illustrated as having an optional filtering step at each URL request, it is appreciated that the system may implement a single filtering step at the first URL request and forego subsequent filtering.

Per step 536, the decryption key is obtained from its designated URL, and the key used to decrypt the received (encrypted) segments (step 538). The content is then rendered on the client device using the decrypted segments and playlist data (step 540).

It will be appreciated that the foregoing methodology may be adapted for use with different configurations, such as where the client device 207 includes provision for assigning permissible addresses to the requests it issues. For example, in one variant, the client device includes an MSO application which is configured to obtain or generate a permissible IP address, and associate this with its content request forwarded to the modem 224. The list or range of permissible addresses obtained by the MSO application may be coded into the application, and/or obtained at startup by the application accessing a dedicated network entity tasked with providing the application a current list/range of addresses (e.g., after user device authentication and user login). The received request may also be optionally filtered at the modem 224 (i.e., to ensure that the address is permissible based on the modem's available information), or alternatively the filtering may be obviated by the cable modem determining that the request was originated (and hence the address assigned) by the "authorized" MSO application (such as via the request carrying the aforementioned MSO application identifying information), and hence its pedigree is assumed known.

It will further be appreciated that the login and guide/content access process described above may be accomplished in any number of different ways. For instance, in one variant, the MSO-provided application on the client 207 is started by the user, and the application immediately requests login information (e.g., user ID, password) before any further actions can be taken with respect to the application. If the login information is successfully entered, the user is given access to the GUI/menu structure of the application, whereby the user can perform various actions such as selecting delivery of a new or updated program guide, select content elements for delivery, etc. At this stage, however, the user has not been authenticated (i.e., by user ID/password, IP address, MAC, etc.) to the MSO network, but rather only to the MSO application resident on the client 207. Once the user selects an action (e.g., deliver Movie X) via the GUI, the proper request is formulated by the application layer, including accessing or using the pointer routine of the modem 224 to provide a permissible IP address at which to obtain the content. However, before content can be delivered, this request must first be authenticated within the MSO network, such as by sending the request (including the user login data) to the appropriate network entity, which may be the origin/CDN server itself, or an MSO security server. In one variant, since the MSO-provided application originated the request, and the MSO-provided modem 224 (pointer routine) provided the IP address(es) for the request, the request is presumed authentic, and no filtering is invoked. The request is then sent from the modem 224 to the target address provided by the pointer, and the request authenticated (i.e., by user login, IP, MAC, subscriber privilege/entitlement, etc.), and upon successful authentication, the content is prepared for delivery as previously discussed herein (i.e., segmented, encrypted, and a playlist prepared).

In another variant, the user initiates the MSO-provided application on the client 207, and is again presented with a login screen. However, at this stage, the login information is transmitted to a designated login server or other entity within the MSO network via the modem 224, the address thereof provided by the pointer routine on the modem 224. The client device application knows the address/port of the modem 224, and forwards the user login data on to the modem 224 for direction to the address selected by the pointer routine. Further interaction with the MSO application on the client is at this point frustrated until the modem 224 receives authorization from the network as to the user's ability to access the MSO network functionality (i.e., based on a verification of the login data, IP address or MAC, entitlements, etc.). Hence, in contrast to the foregoing variant, the present variant is "network centric" for all authentication functionality.

Alternatively, the login to the network (i.e., IP or MAC address authentication, etc.) may be performed upon starting the MSO application; this may be seamless to the user, such as where the MSO application is configured to send its appropriate verification data (IP address, MAC, etc.) to the modem 306, which sends this data according to the appropriate protocol to an address (or multiple addresses) specified by the modem's pointer routine. Once the modem/client has been verified by the network, it is directed to obtain updated guide data from the network. The guide data is forwarded to the client, and populates the menus of the MSO application. The user then can view the guide data, and if interested, select content for delivery. Once the content is selected, the user is then required to login using e.g., user ID and password. This login information is forwarded to a server within the prescribed address space of the MSO network, which verifies the login. At that point, the user request is then forwarded to the appropriate origin or CDN server for delivery of the content.

In yet another variant, the login is accomplished by the user via a non-MSO application (e.g., web browser). The user enters a known URL (e.g., www.twc.com/smart-tv or the like) into their browser, and that request is forwarded to the modem 224 which then applies the filter routine to determine if the request is valid (the client/request may also be given access to other permissible entities as required to resolve the address, such as DNS). The filter may be invoked for instance for every request, or by the absence of the aforementioned MSO-specific application ID data present in the request. The relevant MSO network web server at the address then serves the modem 224 the login web page for the service, and the foregoing protocols regarding login and authentication are then implemented to authenticate the user (login ID/password), their entitlements, and the device (e.g., IP address, MAC, etc.) as desired. This approach has the advantage of obviating an MSO-specific application being loaded onto the client, yet still limits the user's web browsing activities (via the MSO modem 224) to those necessary to invoke streaming services as described herein, and no others (since non-permissible addresses/URLs will not be passed upstream or resolved).

Figure 6:
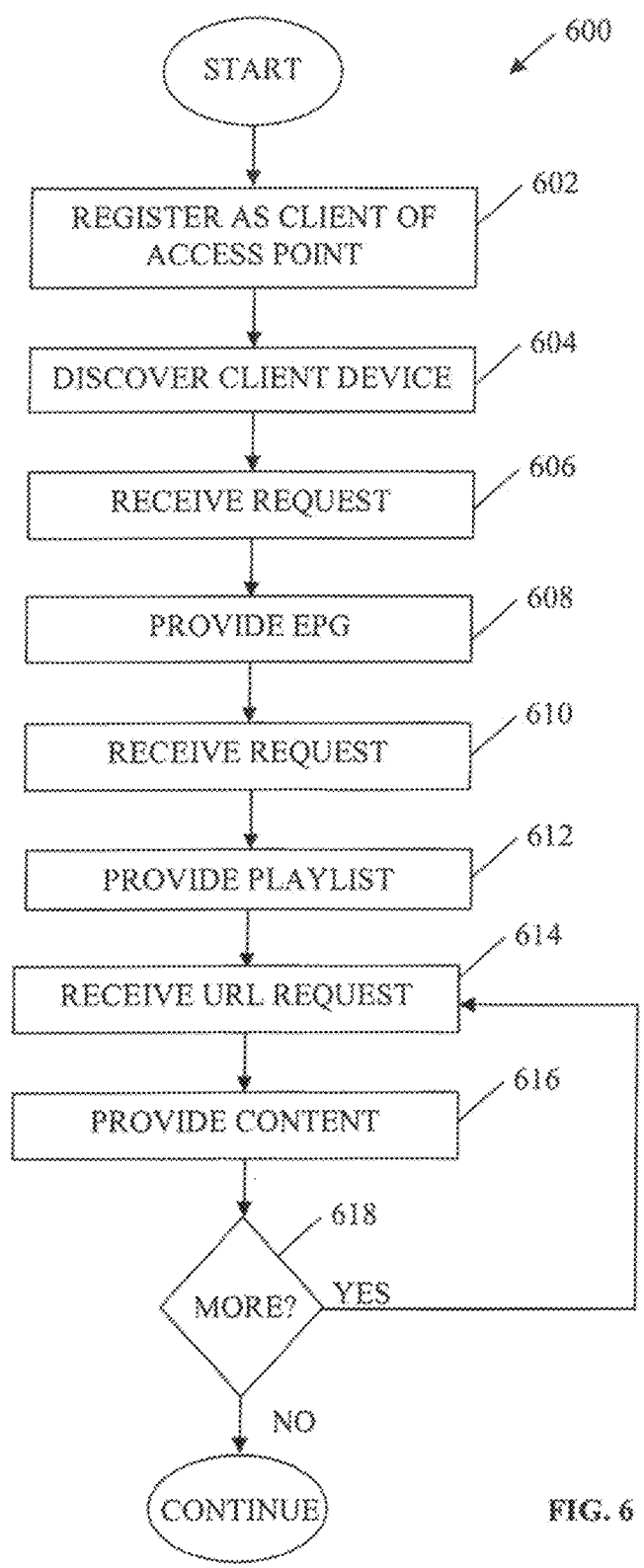

FIG. 6 illustrates an exemplary method 600 for providing content to an IP-enabled device 207 via a content distribution network and third-party access point, such as that illustrated in FIG. 3 herein.

Per step 602 of the method 600, the media server (such as media server modem 306 of FIG. 3) registers as a client of a third-party (non-MSO managed) access point. Registration may include receiving an IP address or other identification from the access point in order for the media server to be recognized thereby. This registration may also occur in advance; i.e., when the premises network/access point or modem 306 is installed.

Next, per step 604, the media server modem 306 is "discovered" in the premises network by the client 207. In one embodiment, this may be accomplished when the user logs into the software application associated with the MSO services (i.e., MSO "app") running on the client device 207. That is, the software application may cause a service or discovery request to be sent to the IP address of the media server modem 306 via the third-party access point 304. It is noted that in this respect, unlike the methodology of FIG. 5, the need for the user to start a separate application.

Once the media server modem 306 has been discovered as an accessible resource of the access point (premises network), the user logs in. As noted above, depending on configuration, the user may log into the MSO application resident on the client 207 alone, or also to the MSO network entity managing logins (the latter in one variant obviating further subsequent login activity). As yet another alternative, the user may simply start the MSO application, and access the menu structures, and be required to log in only when content is selected.

Under any of the foregoing scenarios, the user is given access to the relevant functionality of the MSO application, and the user (via the client device 207) requests access to content and/or a program guide, such as via a menu or icon selection in the MSO-provided application, per step 606. This may include for example an automatic request for a guide update, so that the user has the most current available program listing without further action. If not already performed, login and authentication to the MSO network (versus merely the client device application) may occur at this stage; i.e., as part of the request. In one scenario, the content/guide request from the client 207 is received at the media server modem 306, where the pointer routine adds the necessary addressing information to enable the request to be routed appropriately within the permissible address range/space. The request is then transmitted to the edge cache or origin server within the MSO infrastructure, along with any required network login/authentication entity. Filtering may also optionally be applied as discussed previously herein.

After appropriate authentication/authorization, the requested content or guide data is provided to the device 207 at step 608 per the previously described mechanisms (e.g., requesting and retrieving the relevant playlist (steps 610 and 612), encrypted content segments (step 616), and decryption key in the case of content, or merely obtaining the guide data "in the clear"). This process is repeated for additional content requests (step 618).

It is noted that the methods for providing content to an IP-enabled device 207 in the architecture of FIG. 4 may include various ones of the previously discussed steps for discovering, filtering, authenticating/authorizing, and delivering.

Although discussed herein in an exemplary implementation as a cable modem having an embedded gateway, it is recognized that the concepts discussed herein are equally applicable in the instance the premises device (e.g., cable modem) simply comprises an Ethernet or other network bridge (which does not contain any intelligence or application level functionality). In this instance, the gateway functionality described herein is applicable to the application level intelligence performed by a logically (and/or physically) separate gateway entity or other process. Such separation advantageously enables the gateway to be used for different WAN access technologies (fiber, DSL, etc.), yet may also necessitate additional cost, space and power requirements, service calls, etc.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized client apparatus for receiving digitally rendered content from a managed network, the computerized client apparatus comprising:
   a communications interface;
   a display device; and
   a processor apparatus in communication with the display device and the communications interface, the processor apparatus configured to run at least one computer application thereon, the at least one computer application configured to, when executed:

display a listing of a plurality of digital content elements available for access via at least the managed network;

receive data representative of a selection of at least one of the digital content elements from a user of the computerized client apparatus;

based on the selection being effected via a first computer program application associated with the managed network, invoke a pointer process to generate an appropriate pointer within a prescribed address range or space;

based on the selection being effected via a second computer program application not associated with the managed network, invoke a filter process to block any pointers outside the prescribed address range or space;

transmit data representative of a request to a computerized entity for the selected at least one digital content element via the communications interface;

receive a plurality of segments relating to the selected at least one digital content element from the computerized entity via the communications interface;

receive a playlist from the computerized entity via the communications interface; and use the playlist to utilize at least a portion of the plurality of segments to render the at least one digital content element on the display device.

2. The computerized client apparatus of claim 1, wherein the computerized entity comprises a computerized premises apparatus, the computerized premises apparatus configured to act as a proxy for a managed network apparatus responsible for providing at least some of the plurality of digital content elements to a premises to which the computerized client apparatus belongs.

3. The computerized client apparatus of claim 2, wherein the computerized premises apparatus is configured to transmit at least a portion of the request to the computerized entity in the form of a universal resource locator (URL) within the prescribed range or space.

4. The computerized client apparatus of claim 2, wherein the request is configured by the at least one computer application without a destination address within the managed network, and the computerized premises apparatus is configured to provide a permissible destination address for the request within the managed network from which at least one of the plurality of segments and/or playlist can be obtained.

5. The computerized client apparatus of claim 1, wherein the at least one computer application comprises a login function, the login function configured to, when utilized:

receive login data from the user; and forward at least a portion of the login data to the computerized entity.

6. The computerized client apparatus of claim 5, wherein:
the at least portion of the login data comprises at least a user ID (identifier) and password, and the at least portion of the login data is forwarded to the computerized entity as part of the request; and the at least portion of the login data enables establishment of an entitlement of the computerized client apparatus to access the selected at least one digital content element via access to a subscriber database.

7. The computerized client apparatus of claim 1, wherein:
the plurality of segments received from the computerized entity comprise a plurality of transport stream (.ts) files; and the playlist comprises an M3U (Moving Picture Experts Group Audio Layer 3 Uniform Resource Locator) file.

8. The computerized client apparatus of claim 1, wherein:
the plurality of segments received from the computerized entity are encrypted; and the at least one computer application is further configured to, when executed, obtain a decryption key from the managed network via the computerized entity.

9. The computerized client apparatus of claim 1, wherein the computerized client apparatus comprises an (Internet Protocol) IP-enabled device, and the plurality of segments are transmitted via an IP multicast within the managed network.

10. The computerized client apparatus of claim 1, wherein the filter process is configured to, when executed, filter data received from the computerized client device against at least one of: (i) listing of authorized destination addresses, or (ii) a specified range of authorized destination addresses.

11. A computerized method for receiving digitally rendered content from a managed network, the computerized method comprising:

displaying a listing of a plurality of digital content elements available for access from the network on a computerized display device;

receiving a selection of at least one of the plurality of digital content elements from a user;

causing transmission of data representative of a request to a computerized entity for the at least one selected digital content element via a communications interface;

receiving packetized digitally rendered content from the computerized entity via at least one channel configured for delivery of high-speed data services;

limiting a type of service received by the computerized display device to only data services associated with the packetized digitally rendered content, the limiting comprising restricting the computerized display device from receiving the high-speed data services via the at least one channel; and using the packetized digitally rendered content to render the at least one digital content element on the computerized display device.

12. The computerized method of claim 11, further comprising requesting information from the user, wherein:

the displaying the listing of the plurality of digital content elements available for access occurs only upon receiving the information;

the request comprises the information; and the receiving the packetized digitally rendered content occurs only upon verification of the information by the computerized entity.

13. The computerized method of claim 12, wherein the information comprises a media access control (MAC) address of the computerized display device at which the at least one digital content element is to be rendered.

14. The computerized method of claim 12, wherein the information comprises login and password information.

15. The computerized method of claim 12, wherein the information comprises information regarding a subscription type or level of the user.

16. The computerized method of claim 11, wherein the limiting the type of service received is performed via at least providing at least one destination address within the managed network from a prescribed list of authorized Internet Protocol (IP) addresses.

17. A non-transitory computer-readable apparatus comprising media configured to store a computer program thereon, the computer program comprising a plurality of instructions which are configured to, when executed by a processing apparatus:
- display a listing of a plurality of digital content elements available for access from a managed network on a computerized client device;
- receive data representative of a request for at least one of the digital content elements from the computerized client device;
- transmit the data representative of the request for the at least one digital content element to a computerized entity;
- receive a plurality of segments and a playlist from the computerized entity; and
- use the playlist and at least a portion of the plurality of segments to render the at least one digital content element on the computerized client device;
- wherein both (i) the receipt of the data representative of the request and (ii) the use of the playlist and at least the portion of the plurality of segments invoke application of a filter configured to block any communications or data relating to other data services that are not within a predefined address space, the other data services comprising services that are not necessary for the computerized client device to request or receive the at least one digital content element.

18. The non-transitory computer-readable apparatus of claim 17, wherein the request at least in part utilizes a secure hyper-text transfer protocol (HTTP).

19. The non-transitory computer-readable apparatus of claim 17, wherein the request is transmitted to the computerized entity via, and the plurality of segments are received from the computerized entity via, a third-party access point, the third-party access point configured to provide data from a third party network to an Internet Protocol (IP)-enabled client device.

20. The non-transitory computer-readable apparatus of claim 17, wherein:
- the plurality of segments comprises a plurality of cryptographically protected segments, each segment having a uniform resource locator (URL) for locating individual ones of the plurality of segments;
- the cryptographic protection comprises encryption of the plurality of segments utilizing a symmetric encryption key approach; and
- the plurality of instructions are further configured to, when executed by the processing apparatus receive a decryption key from the managed network via the computerized entity for decryption of the cryptographically protected segments.

* * * * *